United States Patent [19]
Atkinson et al.

[11] Patent Number: 5,121,610
[45] Date of Patent: Jun. 16, 1992

[54] AIR CYCLE AIR CONDITIONER FOR HEATING AND COOLING

[75] Inventors: Michael J. Atkinson; Peter H. Birch, both of East Sussex, Great Britain

[73] Assignee: Aisin Seiki K.K., Aichi, Japan

[21] Appl. No.: 596,657

[22] Filed: Oct. 10, 1990

[30] Foreign Application Priority Data

Oct. 10, 1989 [GB] United Kingdom ............... 8922830
Oct. 10, 1989 [GB] United Kingdom ............... 8922831
Mar. 24, 1990 [GB] United Kingdom ............... 9006628

[51] Int. Cl.⁵ ............................................. F25D 21/06
[52] U.S. Cl. .................................... 62/151; 62/172; 62/228.4; 62/277; 62/324.5; 62/402
[58] Field of Search ............... 62/86, 87, 172, 401, 62/402, 324.2, 324.3, 324.5, 278, 277, 276, 151, 160, 228.4, 229

[56] References Cited
U.S. PATENT DOCUMENTS

3,977,852 8/1976 Edwards .............................. 62/402
4,018,060 4/1977 Kinsell et al. ..................... 62/172 X
4,295,518 10/1981 Rannenberg ....................... 62/401 X
4,430,867 2/1984 Warner ............................. 62/172 X Primary Examiner—Albert J. Makay
Assistant Examiner—John Sollecito
Attorney, Agent, or Firm—Sughrue, Mion, Zinn, Macpeak & Seas

[57] ABSTRACT

A compact, air cycle air conditioning system including compressor, turbine, heat exchanger and high speed electric motor is thermostatically controlled to supply either hot or cold conditioned air to a load air space. In a second arrangement, compact, exhaust gas driven air cycle air conditioning system including a compressor, turbine, two heat exchangers and an exhaust turbine is controlled by means of an exhaust gas bypass arrangement and supplies either hot or cold conditioned air to a load air space. In a third arrangement compact, exhasut gas driven air cycle air conditioning system includes an expansion turbine, two compressors, two heat exchangers and an exhaust turbine which is preferably controlled by means of an exhaust gas bypass arrangement and supplies either hot or cold conditioning air to a load air space.

8 Claims, 32 Drawing Sheets

AIR CYCLE AIR CONDITIONER FOR HEATING AND COOLING

BACKGROUND OF THE INVENTION

The present invention is directed to a compact air conditioning system which uses air as the refrigerant medium and is capable of providing both heating and cooling. More specifically, the invention is directed to an exhaust driven air cycle air conditioner for use in a motor vehicle.

Air cycle air conditioners have been proposed for some years as an alternative to vapour-compression air conditions in residential, or similar, applications; for example, U.S. Pat. No. 4,295,518 and European Patent No. EP 0045144-A2. This is because they have several advantages over vapour-compression systems. Firstly, because the evaporators of vapour-compression devices operate at or near 5° C., their heating capacity is seriously impaired at low ambient temperatures, since they rely on heat transfer from ambient to the evaporator. Secondly, in cold weather ice forms on the evaporator heat transfer surfaces thereby increasing pressure losses and also reducing evaporator effectiveness. Thirdly, vapour-compression devices use chlorofluorocarbons (CFCs) as the refrigerant which presents manufacturing and maintenance problems with regard to refrigerant leakage, problems which are substantially reduced when air is used as the refrigerant. In addition, CFCs are known to have a harmful effect on the Earth's ozone layer and it is thought that they may also be contributing to global warming caused by the co-called greenhouse effect.

Despite these advantages, air cycle air conditioning system have yet to make a significant impact on the residential market. This is largely due to their poor coefficient of performance (C.O.P.) relative to CFC based equipment, but also because air cycle designs have previously been based on conventional electric motors as prime movers and are therefore relatively low speed, and hence large, devices. Prior art air cycle air conditioners do often incorporation regenerative heat exchangers for claimed improvements in C.O.P. However, the improvement is minimal when the increased losses due to the presence of the heat exchanger(s) are taken into account, and may also be seen as expendable when offset against the attendant increases in complexity, size and cost of the conditioning system.

A recognized way of significantly improving the C.O.P. of air cycle devices is to operate in reverse flow mode, i.e. the refrigerant air flows through the turbine, rather than the compressor, prior to the heat exchanger. However, this approach is not common in the prior art, probably because the reduced cycle temperatures can create icing problems in the heat exchanger.

In prior art air cycle air conditioners the air delivery temperature is dictated by the ambient and operating conditions, which may be undesirable in some applications from the point of view of safety and/or comfort. Such air conditioners would therefore be improved by incorporating some means of air delivery temperature control.

SUMMARY OF THE INVENTION

The present invention provides a new and improved air cycle air conditioning system for cooling or heating the load air space comprising a compressor for compressing working air and an expansion turbine for expanding the working air mounted on the same shaft and driven by a high speed motor of the type disclosed in British Patent Application No. 2217118A. The heat exchanger is provided between the expansion turbine and the compressor for removing heat from compressed working air from the compressor or for transferring heat into working air from the expansion turbine through the heat exchanger having a secondary supply of ambient heat exchange air supplied thereto by a fan. The system is switchable between heating and cooling modes in one of which air from the compressor or the expansion turbine is supplied to the load air space and in the other of which air from the secondary supply through the heat exchanger is supplied to the load air space. The system of the invention provides a compact air conditioning system which utilizes the same components to deliver heating or cooling to the load air space depending on the requirements and which uses air as the refrigerant fluid. Switching between heating and cooling load is facilitated using a number of two-way valves.

The present invention is also intended as an alternative to vapor-compression air conditioning systems commonly used in automotive or other similar applications. The invention provides an air cycle air conditioning system for cooling a load air space comprising an exhaust turbine driven by a supply of exhaust gases from an engine, and air compressor driving connected to an expansion turbine with the power requirements of the compressor being provided at least in part by the exhaust turbine, and an expansion air heat exchanger for receiving expanded air from the expansion turbine and delivering it to the compressor for recompression, the expanded air in the expansion air heat exchanger being in heat exchange relationship with a fan-assisted flow of conditioning air to the load air space for effecting cooling of the load air space. Preferably the expansion turbine and compressor are mounted on the same shaft as the exhaust turbine also mounted on the same shaft to provide the power input to the expansion turbine and compressor arrangement. It is a particular feature of the invention that the rotating components are preferably designed to operate at high rotational speed in order to produce a compact and light weight unit. It is also contemplated to utilize a compact electric motor of the type disclosed in British Patent Application No. 2217118A in addition to the exhaust turbine which may be automatically selected to provide the required power input when there is insufficient energy available in the exhaust gas to operate the air conditioner at or near the design point.

The present invention also contemplates a second compressor drivingly connected to an expansion turbine with an expansion air heat exchanger for receiving expanded air from the expansion turbine and delivering it to the two compressors in series for recompression, the expanded air in the expansion air heat exchanger being in heat exchange relationship with a fan assisted flow of conditioning air to the load air space for effecting cooling of the load air space.

The present invention also contemplates the incorporation of a third air compressor in series with the previously mentioned compressor such that it can contribute to the compression process if required. The extra compressor would be drivingly connected to a high-speed compact electric motor of the type referred to above for automatically providing additional power input when there is insufficient energy available in the exhaust gas to operate the air conditioner at or near the design point.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
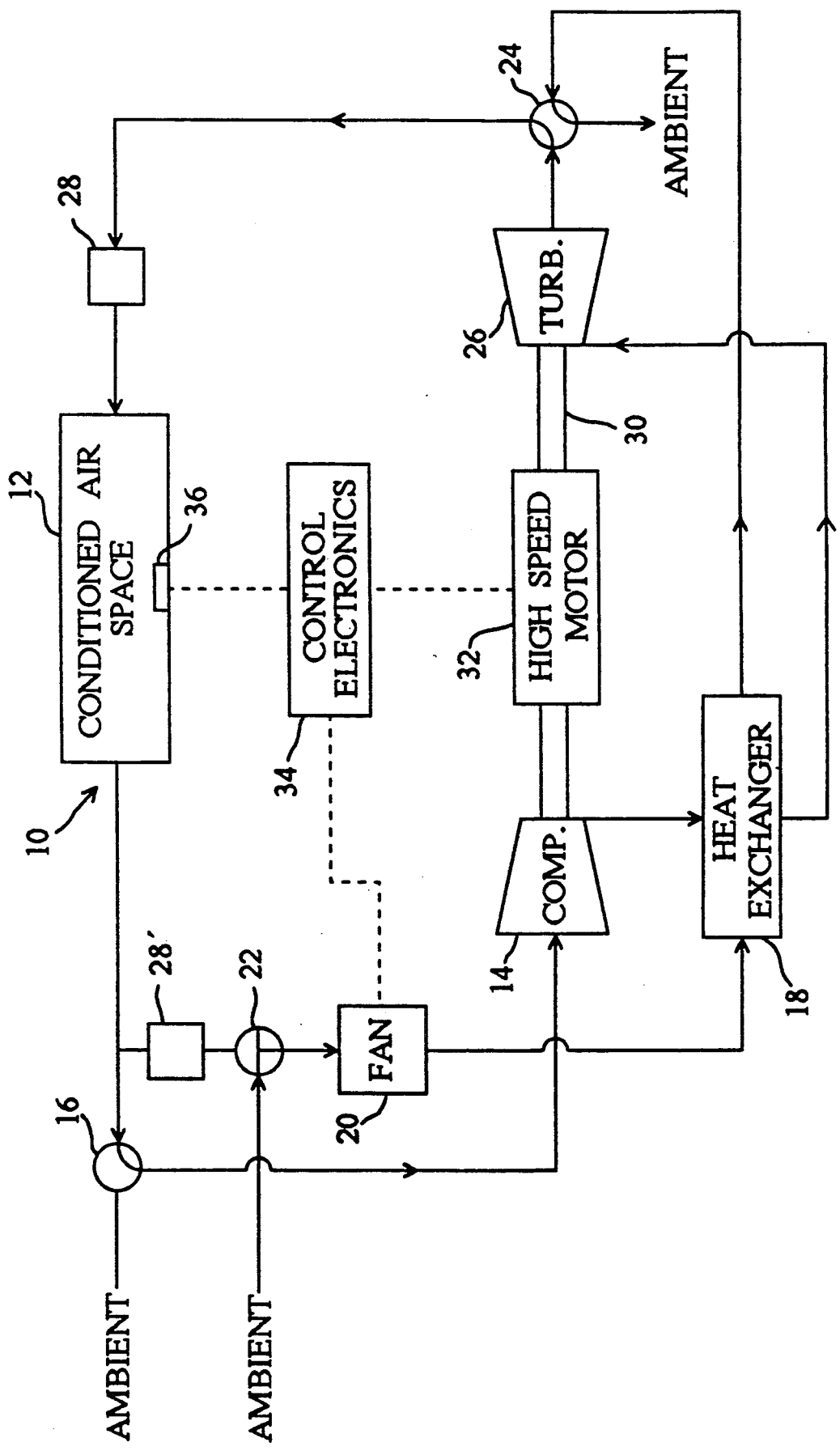
FIG. 1 is a schematic diagram of an air cycle air conditioning system for cooling a load air space using air in a dry, closed loop.

In the following description those components common to the various embodiments are referred to, and shown in the relevant Figures, using the same reference numerals.

FIG. 1 is a schematic representation of the air cycle air conditioning system 10 in cooling mode. The working air is drawn from the conditioned, or load, air space 12 and passes to a compressor 14 via a two-way valve 16. The compressor 14 raises the temperature and pressure of the air which then passes through the high pressure side of an air to air heat exchanger 18. The heat exchanger 18 allows heat energy to be transferred from the working air to a stream of ambient air thereby reducing the temperature of the working air to near ambient.

On leaving the heat exchanger 18 the working air enters a turbine 26 in which it expands back to ambient pressure. Following expansion the working air is substantially cooler than ambient and is fed back into the conditioned air space 12 via the two-way valve 24. A conventional moisture removal device 28 positioned between the turbine 26 and conditioned air space 12 allows control over the humidity of the working air. A further moisture removal device 28' is not used in the cooling mode, and has a function which will be described below with reference to FIG. 4.

The ambient air stream is fed through the heat exchanger 18 by means of an electrically driven fan 20 and via a two-way valve 22; it is then ducted back to ambient via another two-way valve 24.

In passing through the turbine 26 the working air does work which is transferred via a shaft 30 to provide part of the power requirement of the compressor 14. The remaining power needed to drive the compressor 14 is provided by a high speed motor 32 of the type described in British Patent Application No. 2217118A. This is true of all the embodiments described hereafter. The motor 32 is mounted on the shaft 30 between the turbine 26 and compressor 14 in order to produce a more compact device. The use of a high speed motor 32 (of the order of 100,000 rpm) of the type mentioned significantly reduces the size of the compressor 14, turbine 26 and motor 32 relative to those of a similar device designed to operate with a more conventional electric motor.

As shown, the working air circulates in a closed loop thereby reducing or avoiding the ingress of ambient air into the conditioned air space 12 and thus facilitating humidity control. Alternatively, if it is a requirement that fresh air be supplied to the conditioned air space 12 rather than the recirculated air of the closed loop, then it will be appreciated by those skilled in the art that it is a simple matter for ambient air to be ducted into the compressor 14 such that the working air then flows in an open loop. However, this substantially reduces humidity control.

Figure 2:
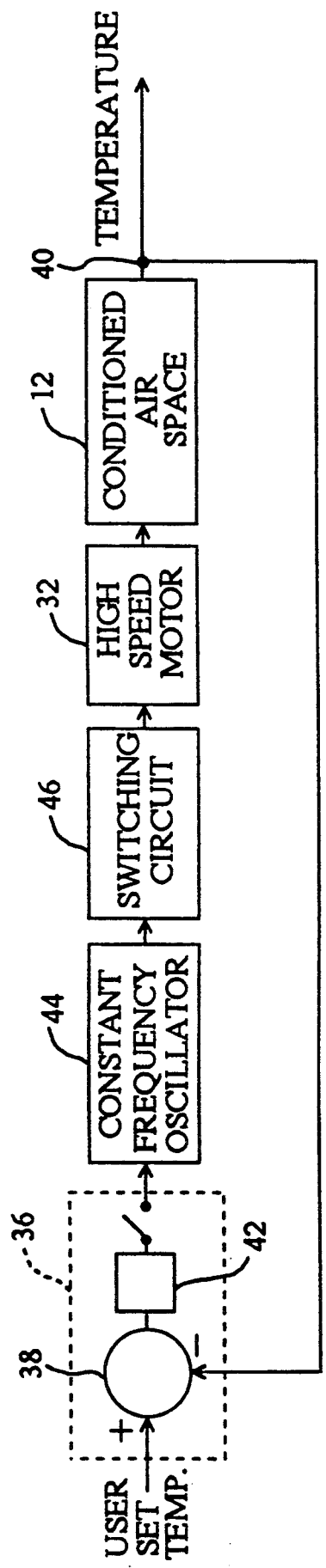
FIG. 2 is a block diagram of a thermostatic control system suitable for use with the air conditioner shown in FIG. 1.
Figure 3:
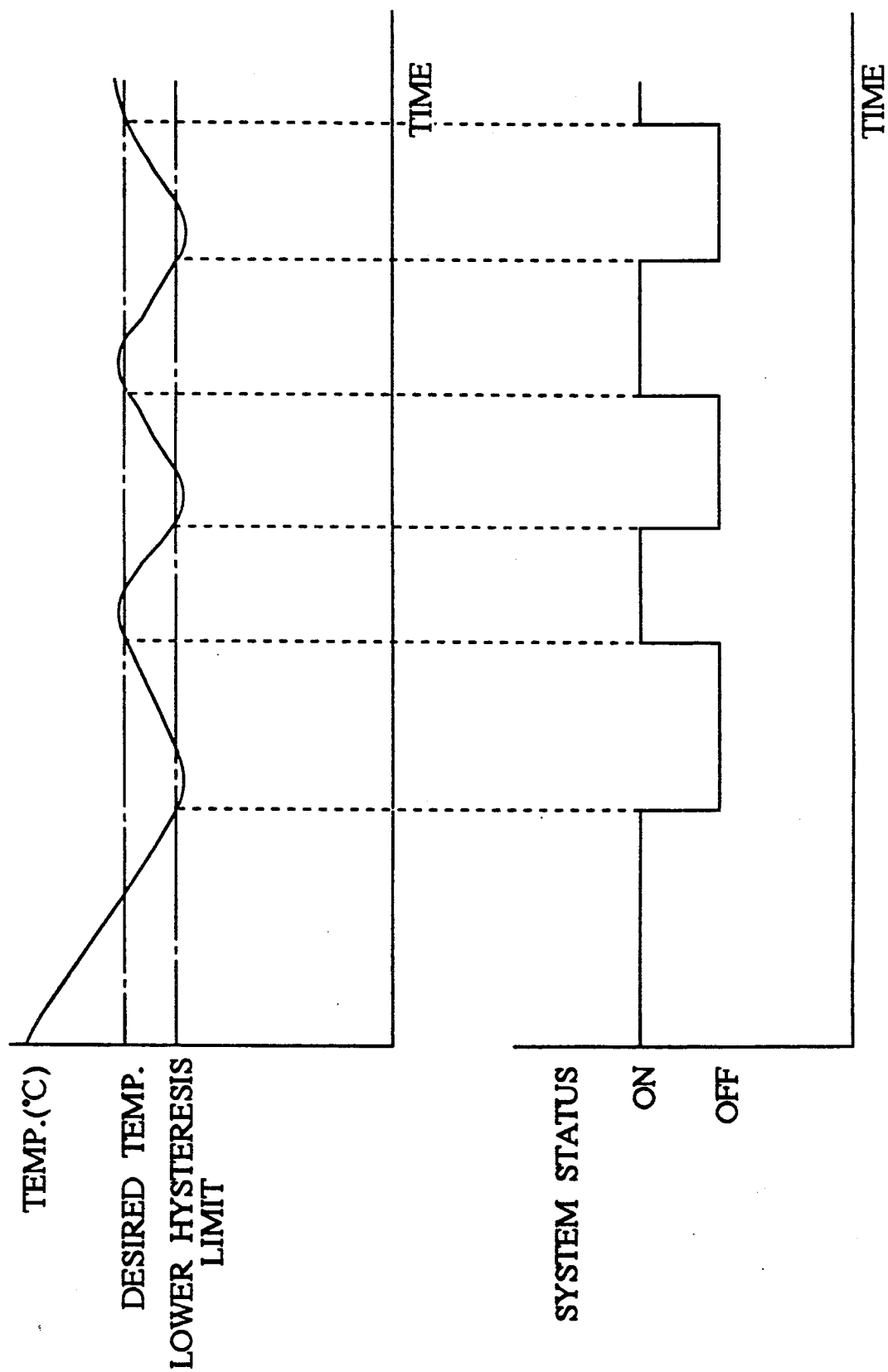
FIG. 3 is a graphical representation of the typical temperature control obtained by using the control system of FIG. 2.

Also represented schematically in FIG. 1 are the electronics 34 necessary for control of the overall device 10. FIG. 2 is a block diagram of one suitable control system. The air conditioner 10 operates at constant nominal design speed with on/off cycling to maintain the desired air space temperature, which is input by the user to the thermostat 36 located inside the conditioned air space 12. The negative feedback summer 38 compares the desired temperature with that measured by the thermostat thermistor 40 and switches the motor electronics on or off whenever the air space temperature goes outside the range defined by the required temperature and a lower limit set by the thermostat 36. A hysteresis circuit 42 prevents the system from cycling too frequently thereby prolonging its life. FIG. 3 illustrates the control process graphically. The motor electronics comprise an oscillator 44 designed to operate at a constant frequency, and a switching circuit 46 implemented using, for instance, thyristors. Electric power to the fan 20 (FIG. 1) is switched simultaneously with the motor electronics.

Figure 4:
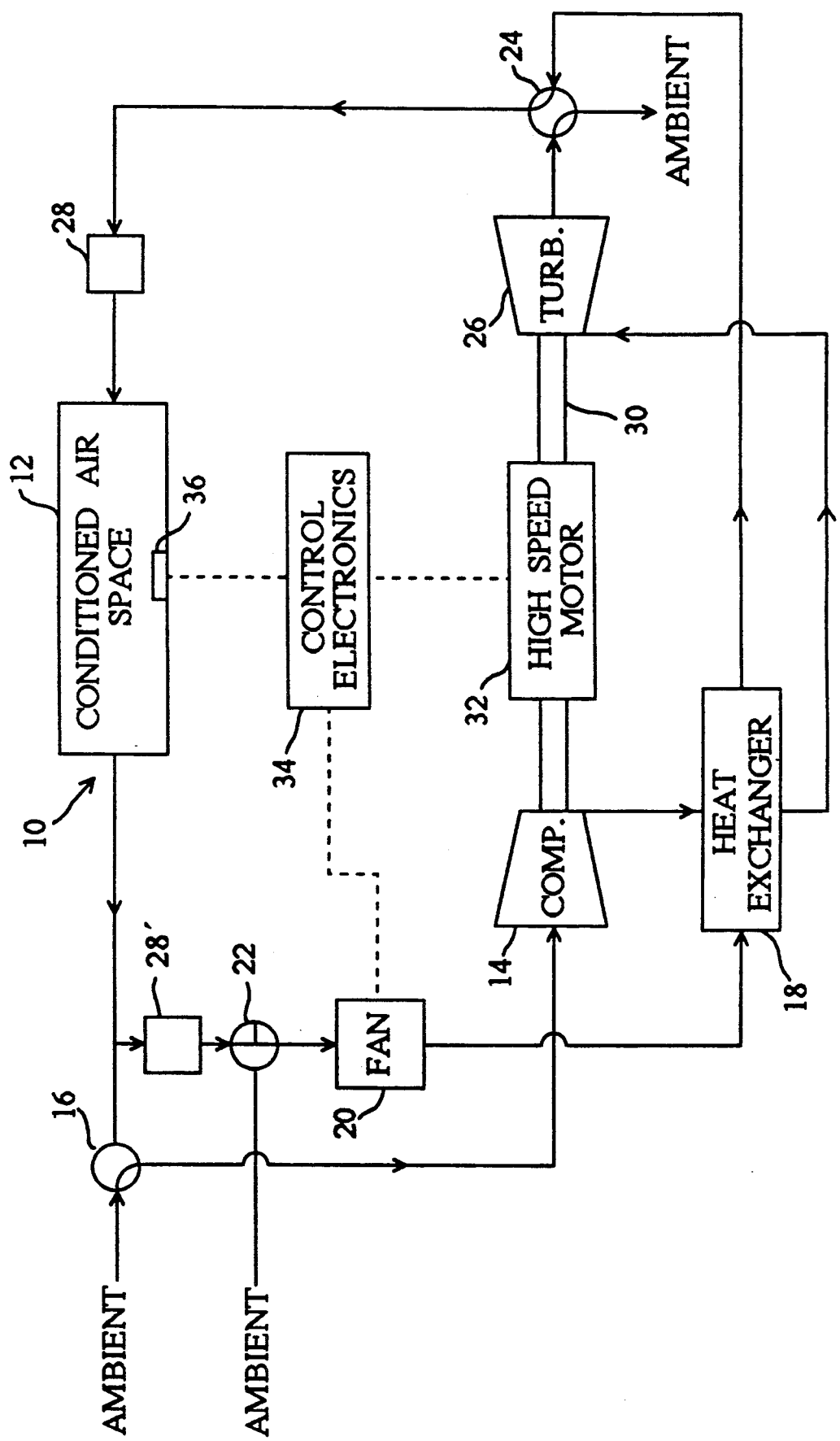
FIG. 4 is a schematic diagram of the air cycle air conditioning system of FIG. 1 but in heating mode for heating a load air space using air in a dry, closed loop.

FIG. 4 is a schematic of the air conditioning system of FIG. 1 modified to operate in heating mode. Switching to heating mode is achieved simply by altering the settings of the valves 16, 22 and 24 as appropriate. As before, the working air passes through the compressor 14, the high pressure side of the heat exchanger 18 and the turbine 26 but in this case the air is ambient and flows in an open loop, being ducted back to ambient on leaving the turbine 26. In this way, any ice which develops due to the low temperature at turbine exit at expelled from the system.

The conditioning air is drawn from the conditioned air space 12 by the fan 20 and passes, via the moisture removal device 28' and valve 22, to the heat exchanger 18 which its temperature is raised by heat transferred from the working air stream; the air is then ducted back to the conditioned air space 12 via the valve 24. The moisture removal device 28' controls humidity in the conditioning air closed loop. As in the cooling mode, it is a simple matter for the conditioning air to be ducted in from ambient if fresh air is required in the conditioned air space 12. However, humidity control is again substantially reduced. Just as in the cooling mode the moisture removal device 28' was redundant, so in the heating mode the moisture removal device 28 is redundant.

The control electronics 34 in the heating mode are the same as for the cooling mode (FIGS. 2 and 3) but in this case the system is switched on and off according to heating demand.

Figure 5:
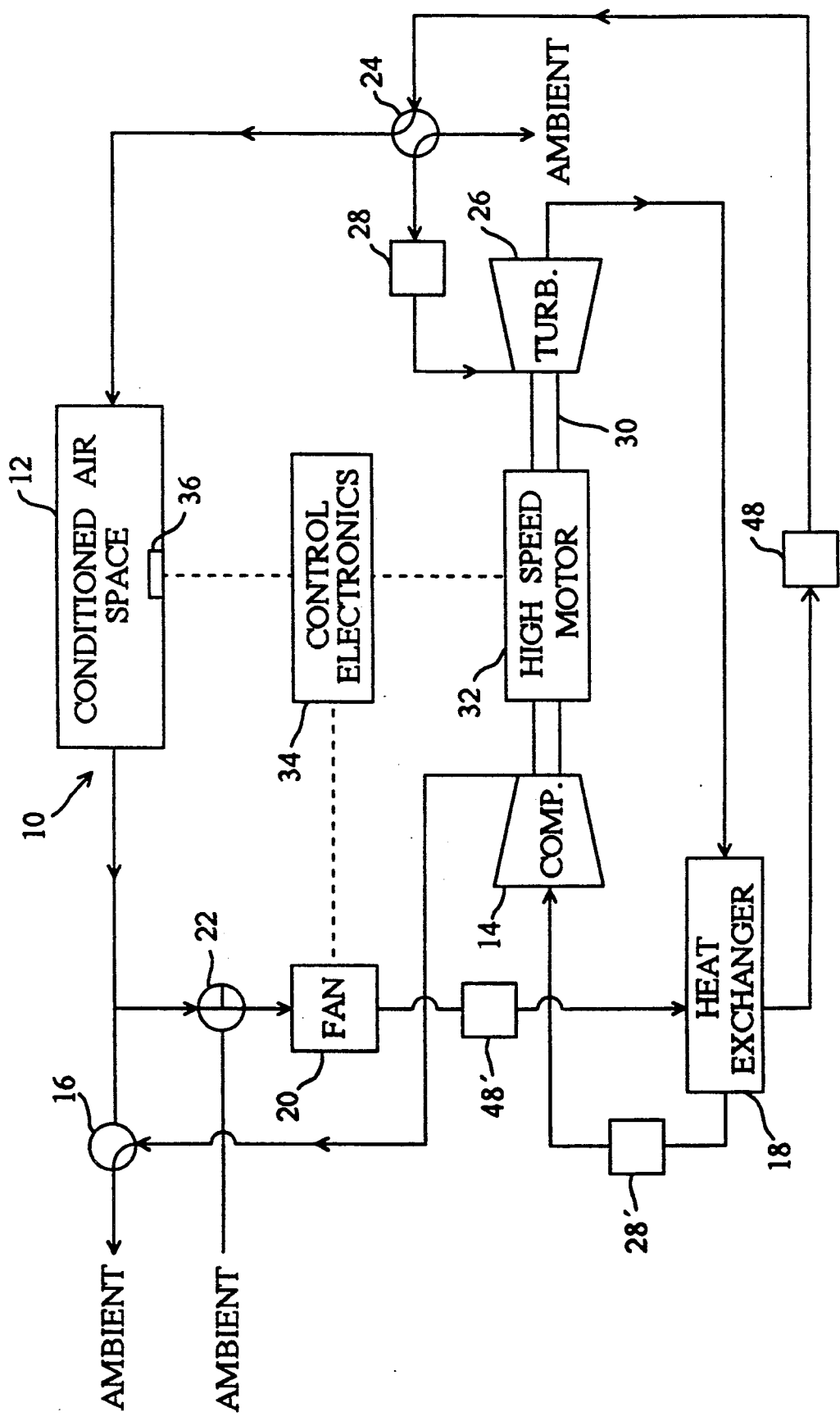
FIG. 5 is a schematic diagram of a reverse flow air cycle air conditioning system for cooling a load air space using air in a dry, closed loop.
Figure 6:
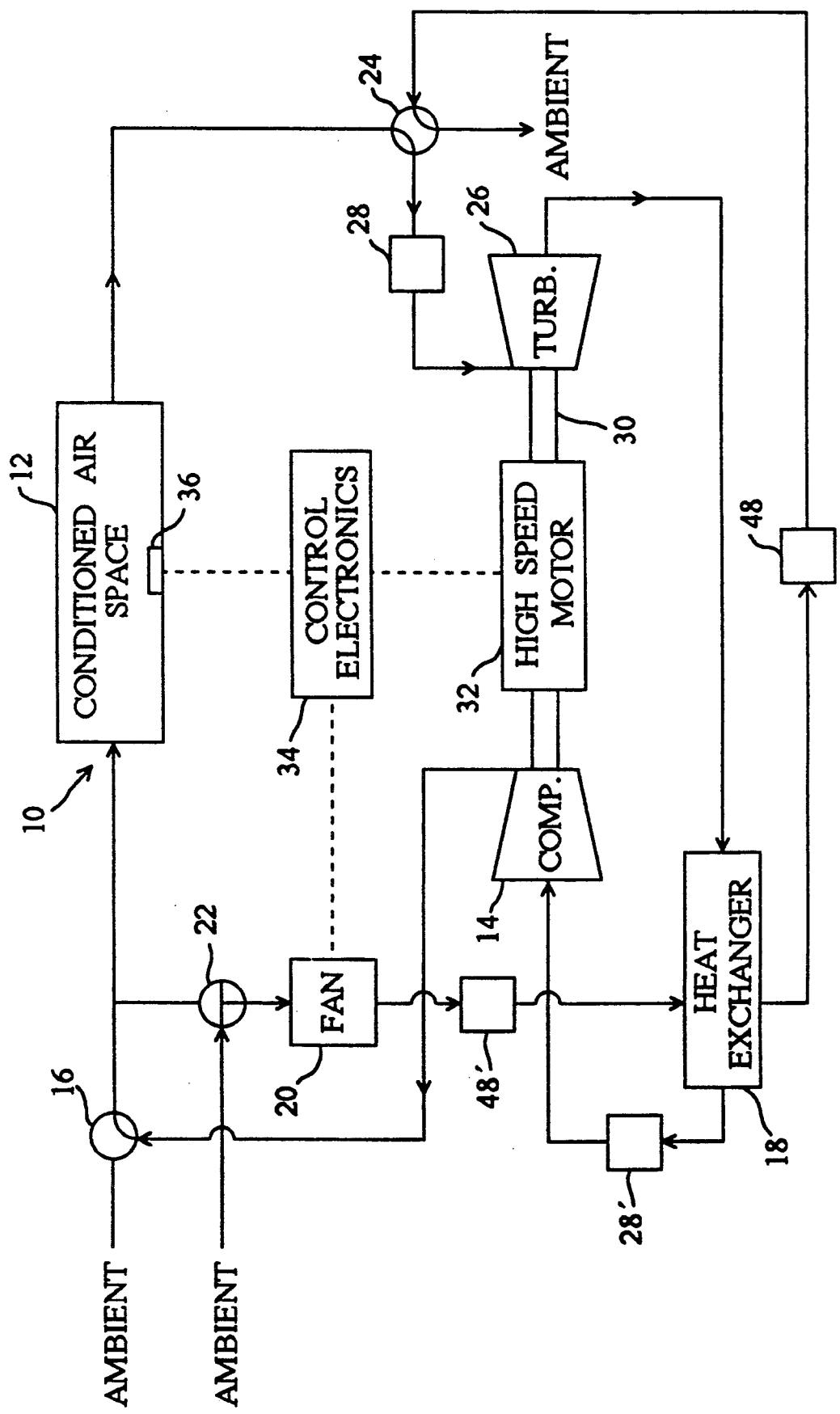
FIG. 6 is a schematic diagram of the reverse flow air cycle air conditioning system of FIG. 5 but in heating mode for heating a load air space using air in a dry, closed loop.

FIGS. 5 and 6 show an embodiment of the air cycle air conditioning system 10 in which the majority of components are the same as for FIGS. 1 and 4 but in which the flow direction of the working air is reversed. This has the effect of significantly improving the coefficient of performance of the system 10.

FIG. 5 is a schematic diagram of the reverse flow air conditioner 10 in cooling mode. As with the embodiment of FIG. 1 the working air flows in a circuit comprising a compressor 14, heat exchanger 18 and turbine 26 but in this case it is an open loop with air being drawn from, and returning to, ambient. As mentioned, the working air enters the turbine 26 first, via valve 24 and a moisture removal device 28, where it is expanded, and hence cooled, to subatmospheric pressure. It then passes through the heat exchanger 18, where it absorbs heat from the conditioning air, and on to the compressor 14 to be compressed back to ambient pressure and finally ducted back to ambient via valve 16. The moisture remover 28 is required in the cooling mode only, to prevent or reduce ice formation in the heat exchanger 18.

The conditioning air is drawn from the conditioned air space 12 and passes, via valve 22 and fan 20, through the ambient pressure side of the heat exchanger 18 thereby rejecting heat to the working air. It then returns to the conditioned air space 12 via a moisture removal device 48 and a valve 24. The moisture removal device 48 allows humidity control of the conditioning air closed loop in the cooling mode. As with the embodiments of FIGS. 1 and 4, ambient air may be used as the conditioning air in an open loop but humidity control is again restricted.

FIG. 6 is a schematic diagram of the reverse flow air conditioner 10 of FIG. 5, but in heating mode. The device is switched to heating mode by altering the settings of the two-way valves 16, 22 and 24 as appropriate. In this embodiment, as in that of FIG. 1, the working air is also the conditioning air and is drawn from the conditioned air space 12. It then expands through the turbine 26, takes up heat from ambient air in the heat exchanger 18 and is returned to ambient pressure by the compressor 14 before being ducted back to the conditioned air space 12, via valve 16, at an elevated temperature. In this mode the moisture removal device 28 is redundant. A moisture remover 28' positioned at the heat exchanger outlet controls humidity in the conditioning air closed loop in this heating mode. The ambient air which rejects heat to the conditioning air is ducted via valve 22 and fan 20 to the heat exchanger 18 and back to ambient via valve 24. In this mode the moisture removal device 48 is also redundant. A second moisture removal device 48' is positioned in the duct between the fan 20 and the heat exchanger 18 to prevent ice from forming in the heat exchanger 18.

As with the previous embodiments, if fresh rather than recirculated air is required then ambient air may be used as the conditioning air in an open loop. However, in this case the moisture removal device 28 would no longer be redundant in the heating mode, but would be required between the air inlet and turbine 26 to prevent icing problems in the heat exchanger 18.

The control electronics 34 for the reverse flow embodiments in FIGS. 5 and 6 are the same as that described for the embodiment shown in FIG. 1, with on/off cycling controlled according to cooling and heating demand respectively.

Figure 7:
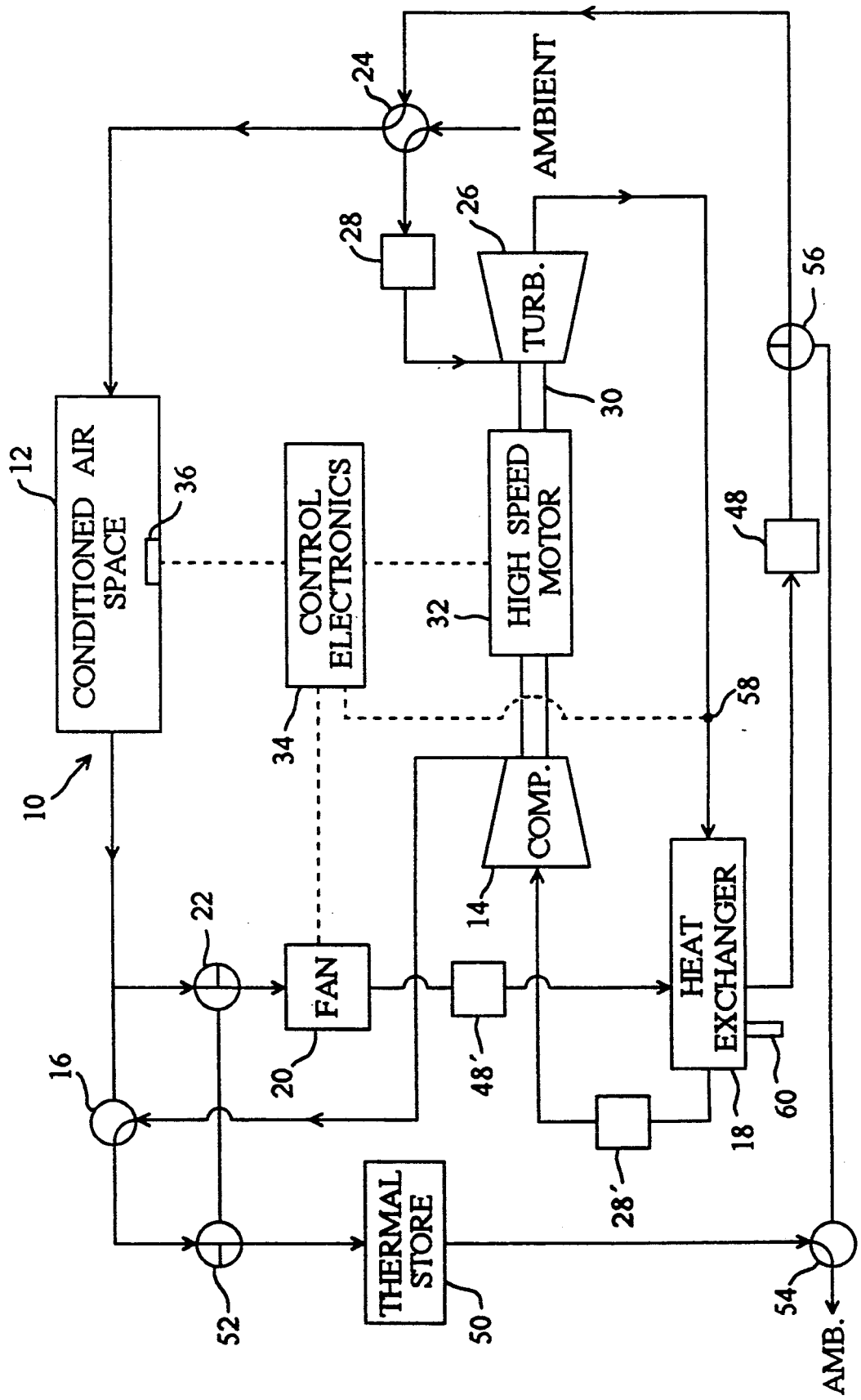
FIG. 7 is a schematic diagram of a reverse flow air cycle air conditioning system according to the invention in cooling mode for cooling a load air space, which stores a proportion of the rejected heat in a thermal store for use in a heat exchanger de-icing cycle.

In both the cooling and heating modes of the reverse flow embodiments of FIGS. 5 and 6, sub-zero temperatures are encountered at the heat exchanger 18 for a wide range of ambient and operating conditions. Therefore, despite the presence of moisture removers, it is likely that gradual icing of the heat transfer surfaces of the heat exchanger 18 will occur, thus impairing its performance. FIG. 7 shows the reverse flow embodiment of FIG. 5 in cooling mode modified to incorporate a de-icing circuit and thereby to alleviate this problem. The circuit comprises a thermal store 50, for instance, heat storing bricks, three two-way valves 52, 54 and 56 and appropriate ducting. During normal operation the flow of air within the main cycle is largely as described for FIG. 5. However, when the hot air leaves the compressor 14 it is ducted through the thermal store 50 via valves 16 and 52 before reaching ambient via valve 54, and in doing so the air gives up a proportion of its heat to the thermal store 50.

A pressure sensor 58 positioned upstream of the low pressure side of the heat exchanger 18 detects any build up of back pressure due to ice blocking the heat exchanger passages. If the pressure reaches a factory-set level the control electronics 34 switch the main cycle off and cause the settings of valves 22, 52, 54 and 56 to be altered such that air is driven, by the fan 20, around a closed loop from the thermal store 50 to the heat exchanger 18 via valves 54 and 56, and back to the thermal store 50 via the fan 20 and valves 22 and 52. In this way heat energy stored in the thermal store 50 is used to de-ice the heat exchanger 18, the resultant water leaving said heat exchanger via a drain 60. This continues for a factory-set time period sufficient to complete the de-icing, after which the control electronics 34 switch the system back to normal operating mode.

In the reverse flow heating mode the hot air produced by the compressor is used to heat the conditioned air space 12 and cannot, therefore, be used to heat a thermal store during normal operation as described for FIG. 7. A de-icing circuit similar to that in FIG. 7 is feasible but would be highly inefficient since the de-icing mode would require an initial phase in which hot air was directed through the thermal store, followed by a second phase in which the heat thus stored was used to de-ice the heat exchanger.

Figure 8:
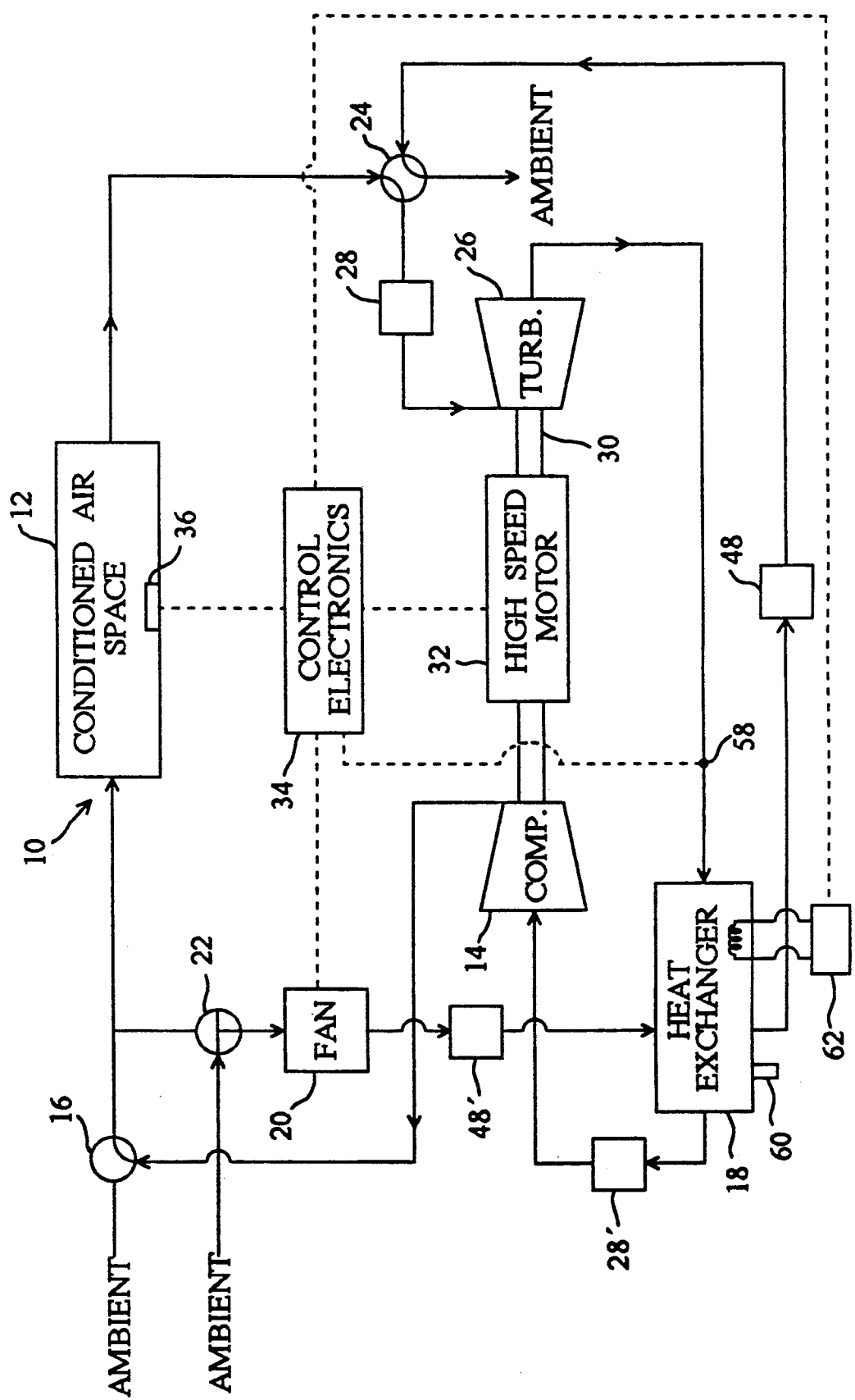
FIG. 8 is a schematic diagram of a reverse flow air cycle air conditioning system according to the invention in heating mode for heating a load air space, which incorporates a heating element in the heat exchanger for de-icing purposes.

FIG. 8 therefore shows a more practical system of de-icing when the reverse flow system is in the heating mode as in FIG. 6. As before, the control electronics 34 switch the main cycle off if the back pressure upstream of the heat exchanger 18, as detected by pressure sensor 58, exceeds a factory-set level. In this case, however, de-icing is achieved by direct heat input to the heat exchanger 18 from a suitably sized electrical resistance heating element 62, the resultant water again leaving said heat exchanger via the drain 60. It will be appreciated by those skilled in the art that heat input to the heat exchanger 18 for de-icing purposes may be achieved in a variety of ways but that the basic principle remains the same. It will also be appreciated that this approach may also be adopted in the reverse flow cooling mode as an alternative to the de-icing circuit described in FIG. 7.

Figure 9:
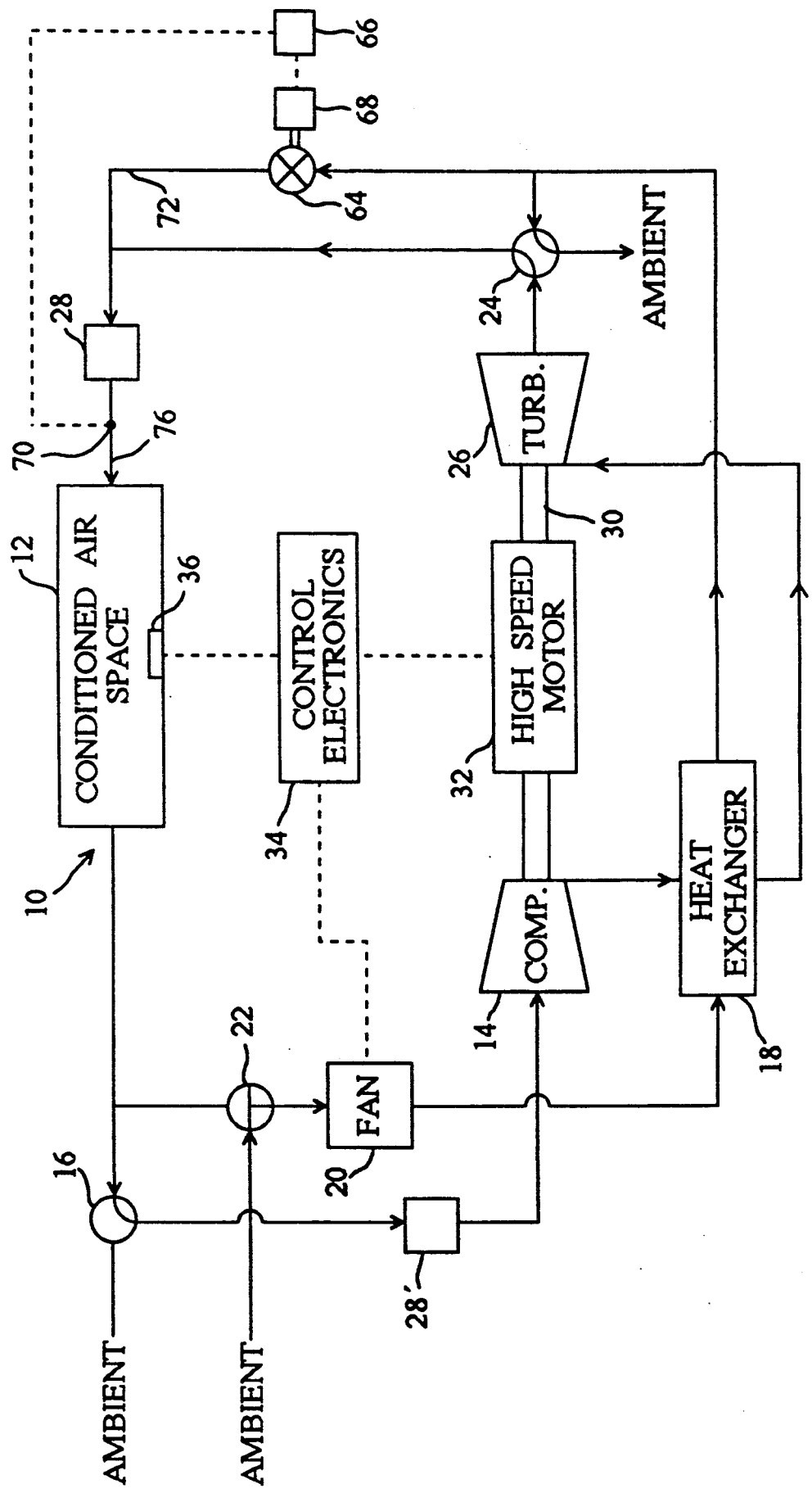
FIG. 9 is a schematic diagram of the air conditioning system of FIG. 1 modified to allow a controlled amount of the hot secondary air from the heat exchanger in the cooling mode to be mixed with the cold conditioning air, thereby enabling control of the air delivery temperature.

FIG. 9 shows the embodiment of FIG. 1 modified to allow a greater degree of control over the conditioned air. As well as the control electronics 34 described previously (FIGS. 2 and 3), the addition of a control valve 64, controller 66, actuator 68, temperature sensor 70 and extra duct 72 allows a controlled amount of air to be diverted from the hot air stream leaving the ambient pressure side of the heat exchanger 18 and mixed, via the duct 72, with the cold air leaving the turbine 26. In this way the temperature at which the conditioning air is delivered to the conditioned air space 12 can be adjusted.

Figure 10:
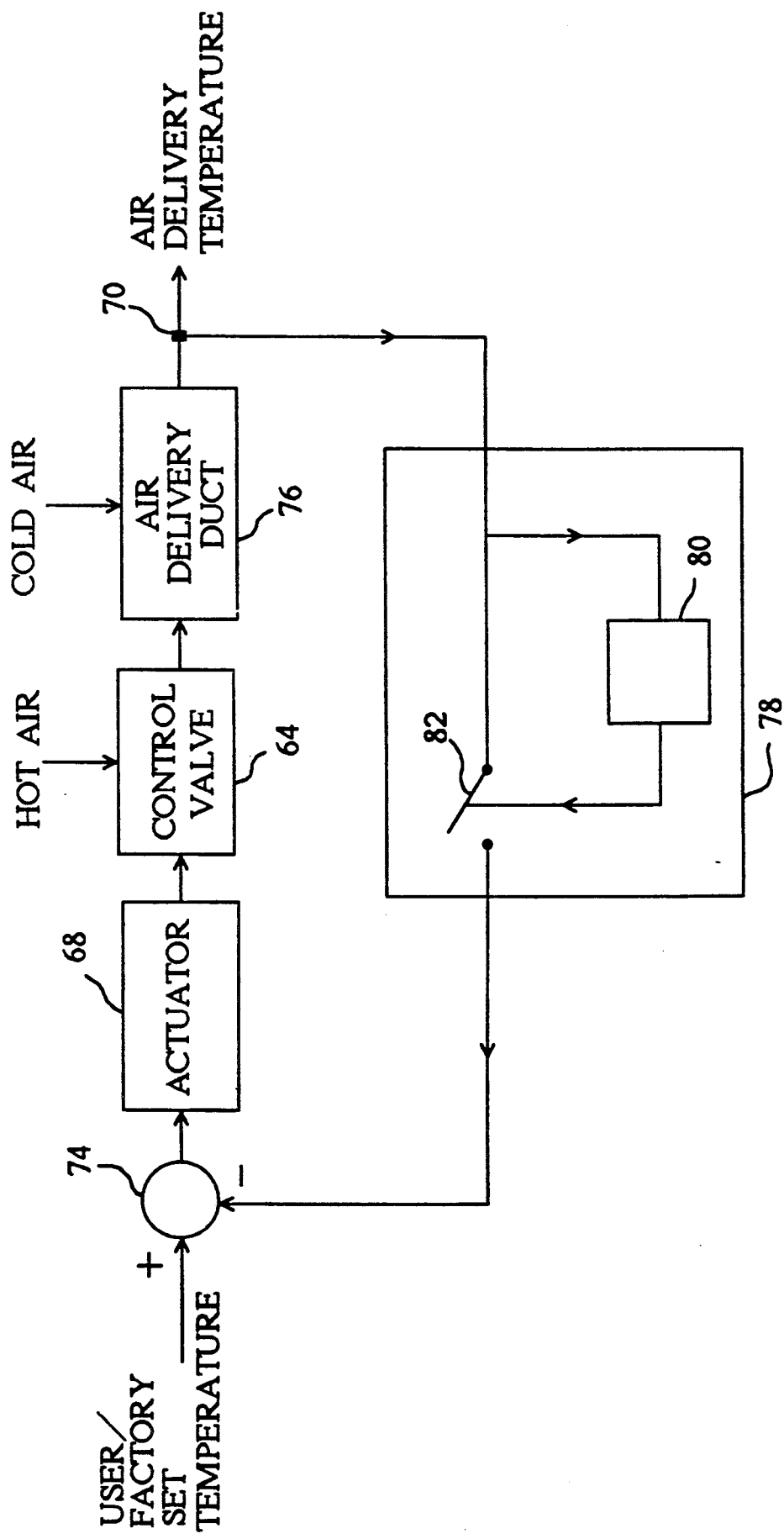
FIG. 10 is a block diagram of a preferred control system for obtaining the desired air delivery temperature from the air conditioning system of FIG. 9.

FIG. 10 is a block diagram of a preferred additional control system for the embodiment of FIG. 9, which is operational whenever the air conditioner 10 is switched on by the thermostatic control described previously (FIG. 2). The desired air delivery temperature may be input by the user but would normally be factory-set. A negative feedback summer 74 compares the set temperature with that measured by the temperature sensor 70 positioned in the air delivery duct 76, and adjusts the valve 64 by means of the actuators 68 thereby altering the amount of hot air diverted through the duct 72. The air delivery temperature is adjusted in this way until it lies within a temperature band defined in the feedback circuit 78 by a high/low threshold crossing detector 80. Once the measured temperature lies within this band a switch 82 is opened to nullify the feedback and hence maintain the current setting of the control valve 64. If the temperature subsequently drifts out of the band, for instance, due to a change in ambient conditions, then the switch 82 is again closed and adjustment of the valve 64 resumes.

It will be clear to those skilled in the art that control of the air delivery temperature in this way may be applied to all of the air conditioner embodiments described previously, with slight modifications determined by the appropriate point from which hot or cold air should be diverted.

Figure 11:
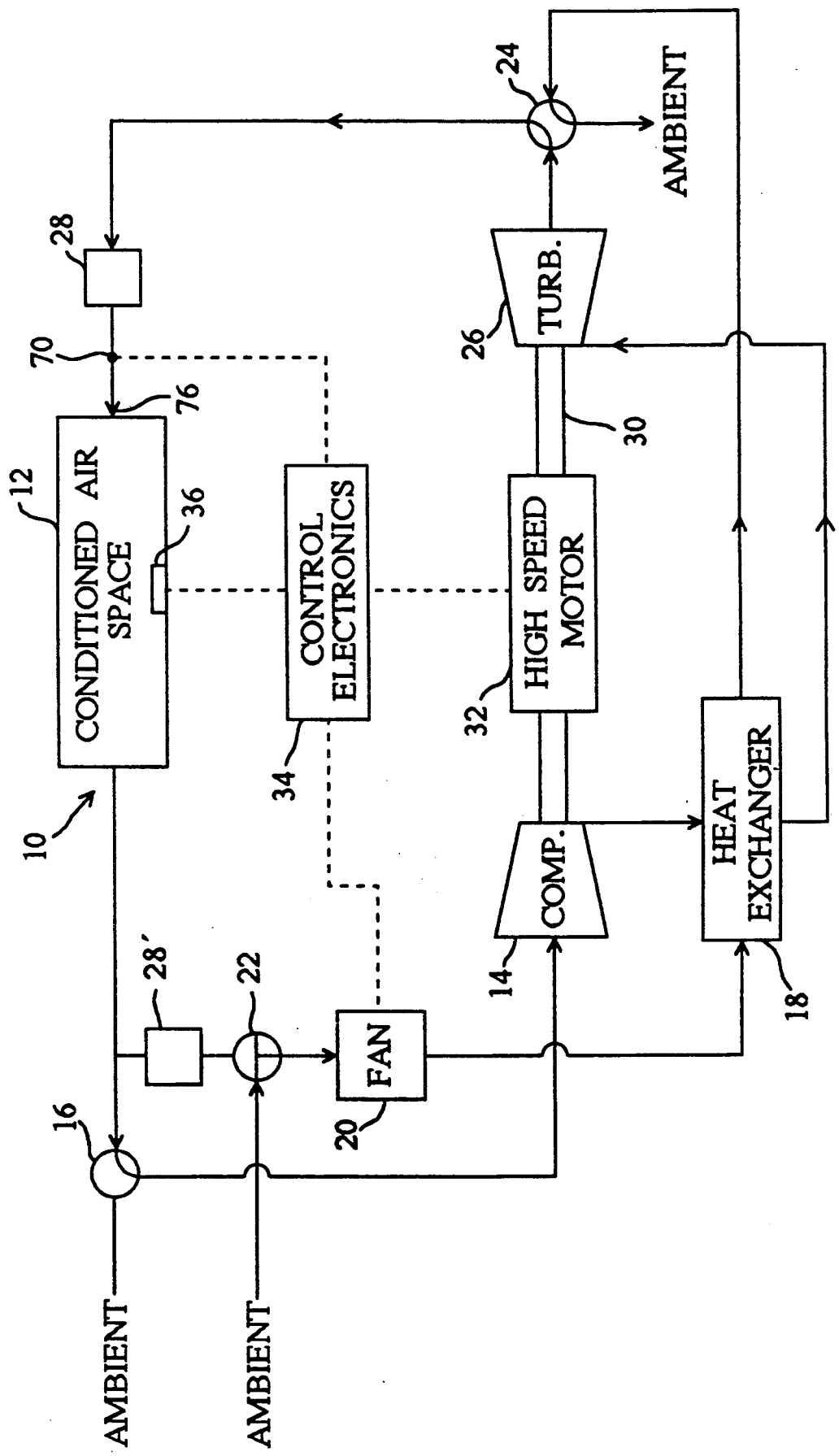
FIG. 11 is a schematic diagram of the air conditioning system of FIG. 1 modified to allow variable speed control of the high speed motor thereby enabling control of the air delivery temperature.

FIG. 11 shows the embodiment of FIG. 1 modified to facilitate control of the air delivery temperature (in cooling or heating mode) by varying the speed of the high speed motor 32; changing the motor speed alters the air cycle compression ratio and hence the cycle temperatures, thereby providing a means of controlling the temperature at which air is delivered to the conditioned air space 12. The modifications to the embodiment of FIG. 1 comprise a temperature sensor 70 positioned in the air delivery duct 76, and changes to the control system.

Figure 12:
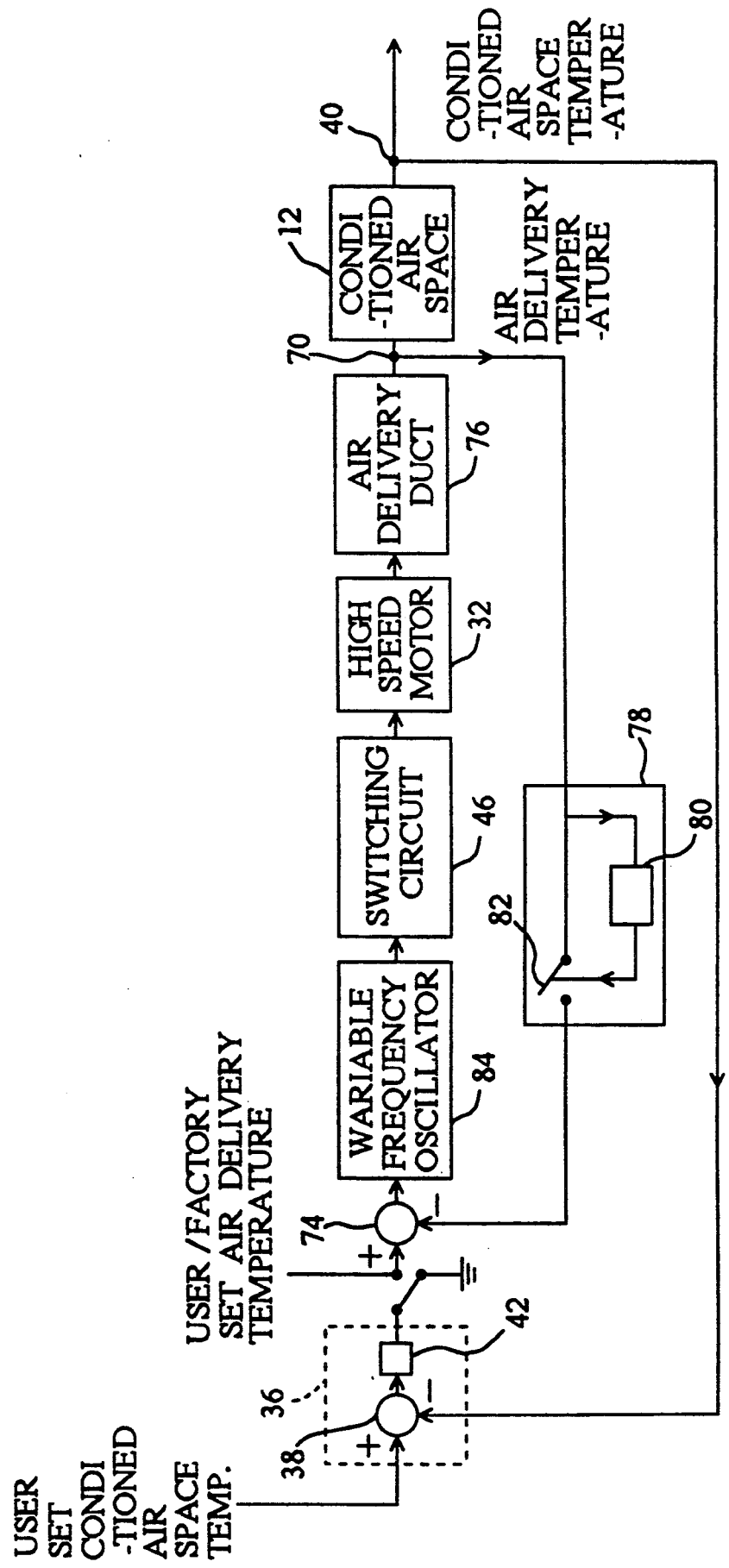
FIG. 12 is a block diagram of a preferred overall control system for obtaining thermostatic control of, and the desired air delivery temperature from, the air conditioning system of FIG. 11.

FIG. 12 is a block diagram of a preferred modified control system for the embodiment of FIG. 11. As with the previous embodiments, the temperature of the conditioned air space 12 is maintained at the user specified temperature by thermostatic control. However, in this case, a variable frequency oscillator 84 enables the motor speed to be adjusted by a negative feedback summer 74 which compares the temperature measured by the air delivery sensor 70 with the user or factory-set desired temperature. In this way the motor speed and hence air delivery temperature is adjusted until it lies within a temperature band determined in the feedback circuit 78 by a high/low threshold crossing detector 80.

Once the measured air delivery temperature lies within this band a switch 82 is opened to nullify the feedback and hence maintain the current motor speed. If the temperature subsequently drifts out of the band then the switch 82 is again closed and adjustment of the motor speed resumes.

It will be appreciated by those skilled in the art that control of the air delivery temperature in this way may also be applied to the air conditioner embodiments shown in FIGS. 5 to 10.

In the following description the various embodiments referred to all utilize the exhaust gas from an internal combustion engine and are especially suitable as motor vehicle air conditioners.

Figure 13:
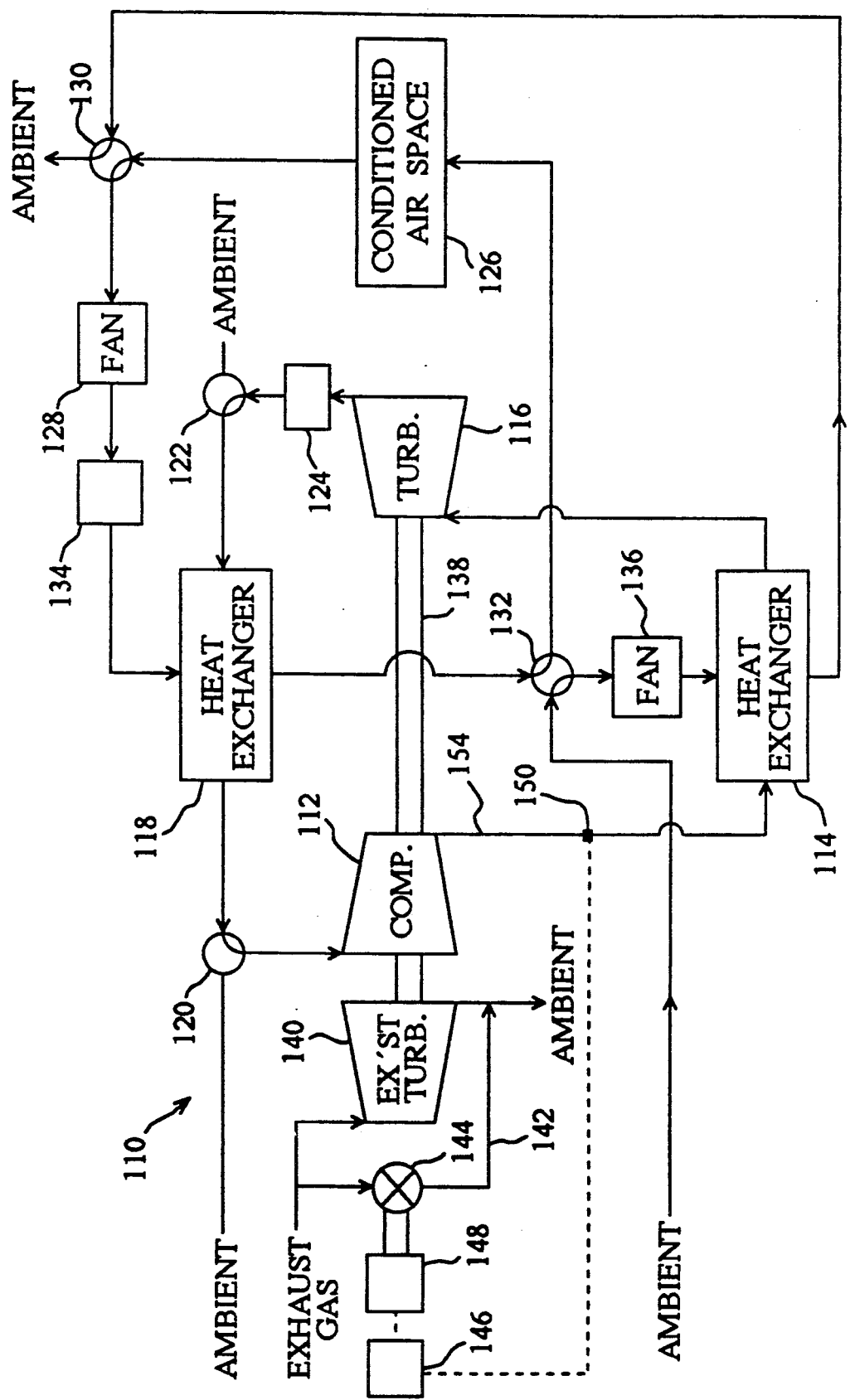
FIG. 13 is a schematic diagram of an exhaust driven air cycle air conditioning system according to the invention for cooling a load air space using air in a dry, closed loop.

FIG. 13 is a schematic diagram of an air cycle air conditioning system 110 according to the invention in cooling mode. The working air flows in a closed loop comprising: a compressor 112 which raises the temperature and pressure of the air; a compression air heat exchanger 114 in which heat is rejected to an ambient air stream; a turbine 116 in which the compressed and cooled air is expanded back to its original pressure; an expansion air heat exchanger 118 in which heat is absorbed from the conditioning air stream; two two-way valves 120 and 122 which are adjusted such that they maintain the working air closed loop; and a moisture removal device 124 positioned between the turbine 116 and the valve 122 to prevent ice from forming in the heat exchanger 118.

The conditioning air is drawn from the conditioned, or load, air space 126 by means of an electrically powered fan 128, and passes through the expansion air heat exchanger 118 via the fan 128 and a two-way valve 130. Heat is rejected to the working air stream within the heat exchanger 118 and the cooled conditioning air returns to the conditioned air space 126 via another two-way valve 132. Humidity is controlled in the conditioning air closed loop by means of a moisture removal device 134 positioned between the fan 128 and heat exchanger 118. The ambient air stream is fed through the low pressure side of the compression air heat exchanger 114 by means of a second electrically powered fan 136 and via valve 132. Heat is absorbed from the working air stream within the heat exchanger 114 and the ambient air is then ducted back to ambient via valve 130.

Another moisture removal device 134', between the unconditioned air space 126 and the two-way valve 130, is not used in the cooling mode of the system but is described below in connection with the system in heating mode.

In passing through the turbine 116 the working air does work which is transferred via a shaft 138 to provide part of the power requirement of the compressor 112. The remaining power needed to drive the compressor 112 is obtained from an exhaust gas source, for instance a car exhaust, which is used to drive an exhaust turbine 140 mounted on the same shaft 138. The exhaust turbine 140 is designed to operate at high rotational speed, thereby reducing the size of the rotating components for a given duty, and hence resulting in a compact air conditioner 110. The amount of exhaust gas passing through the exhaust turbine 140 is controlled by means of a bypass duct 142, bypass control valve 144, valve controller 146, valve actuator 148 and pressure sensor 150 such that operation of the air conditioner 110 is maintained at or near design conditions.

Figure 14:
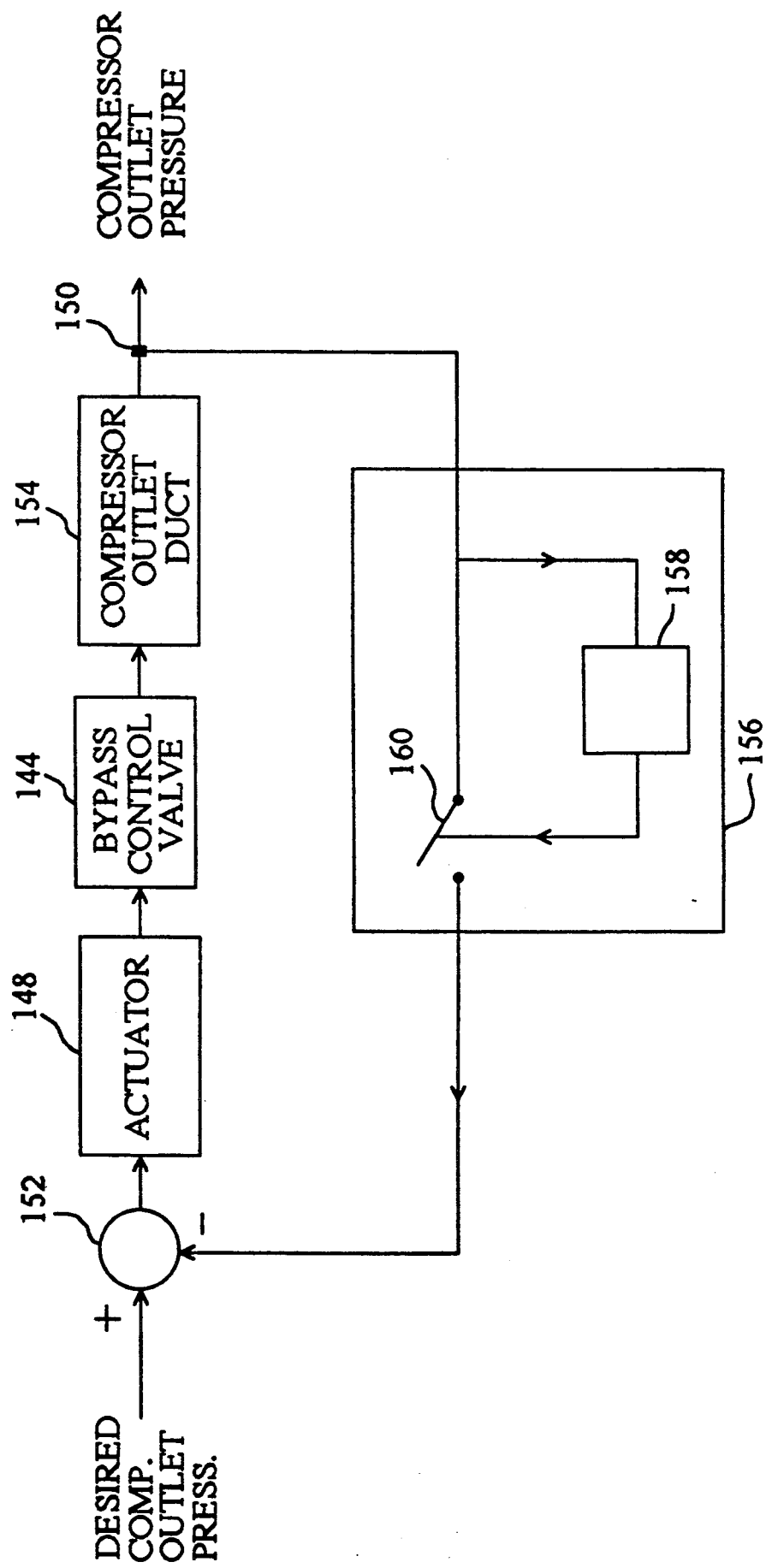
FIG. 14 is a block diagram of the preferred control system for obtaining the required power input to the air conditioning system of FIG. 13.

FIG. 14 is a block diagram of the preferred control system for achieving this. The design operating condition is factory-set in terms of a desired compressor outlet pressure which is compared by a negative feedback summer 152, with the pressure measured by pressure sensor 150 positioned in the compressor outlet duct 154. The summer 152 adjusts the bypass control valve 144 by means of the actuator 148 thereby altering the amount of exhaust gas allowed to bypass the exhaust turbine 140. In this way the power input to the compressor 112 is adjusted until the compressor outlet pressure lies within a factory-set pressure band defined in the feedback circuit 156 by a high/low threshold crossing detector 158. Once the measured pressure lies within this band a switch 160 is opened to nullify the feedback and hence maintain the current setting of the control valve 144. When the measured pressure subsequently moves out of the band, for instance, due to a sufficient change in car engine condition, the switch 160 is again closed and adjustment of the valve 144 resumes.

The control system described in the preceding paragraph is incorporated in all of the embodiments described hereafter. It will be appreciated by those skilled in the art that a parameter other than compressor outlet pressure, for instance, rotational speed or compression ratio, may be used as a measure of the operating condition without departing from the scope of the invention as described. It will also be appreciated that control can be facilitated at less expense using a simple mechanical link between the bypass valve 144 and sensor 150 such as those commonly used in automotive turbochargers. However, the valve setting is then limited to only two discrete settings, e.g. fully open and fully closed.

As described for FIG. 13, the conditioning air circulates in a closed loop. If it is a requirement that fresh air be supplied to the conditioned air space 126 rather than the recirculated air of the closed loop, then it will be appreciated by those skilled in the art that it is a simple matter for ambient air to be ducted into the fan 128 as conditioning air, and for the air leaving the conditioned air space 126 to be ducted back to ambient. However, operation in this way substantially reduces humidity control. The expansion air heat exchanger 118 ensures that the conditioning air is isolated from the working air in the event that the working air becomes contaminated due to the ineffective sealing or seal failure between the exhaust turbine 140 and compressor 112.

Figure 15:
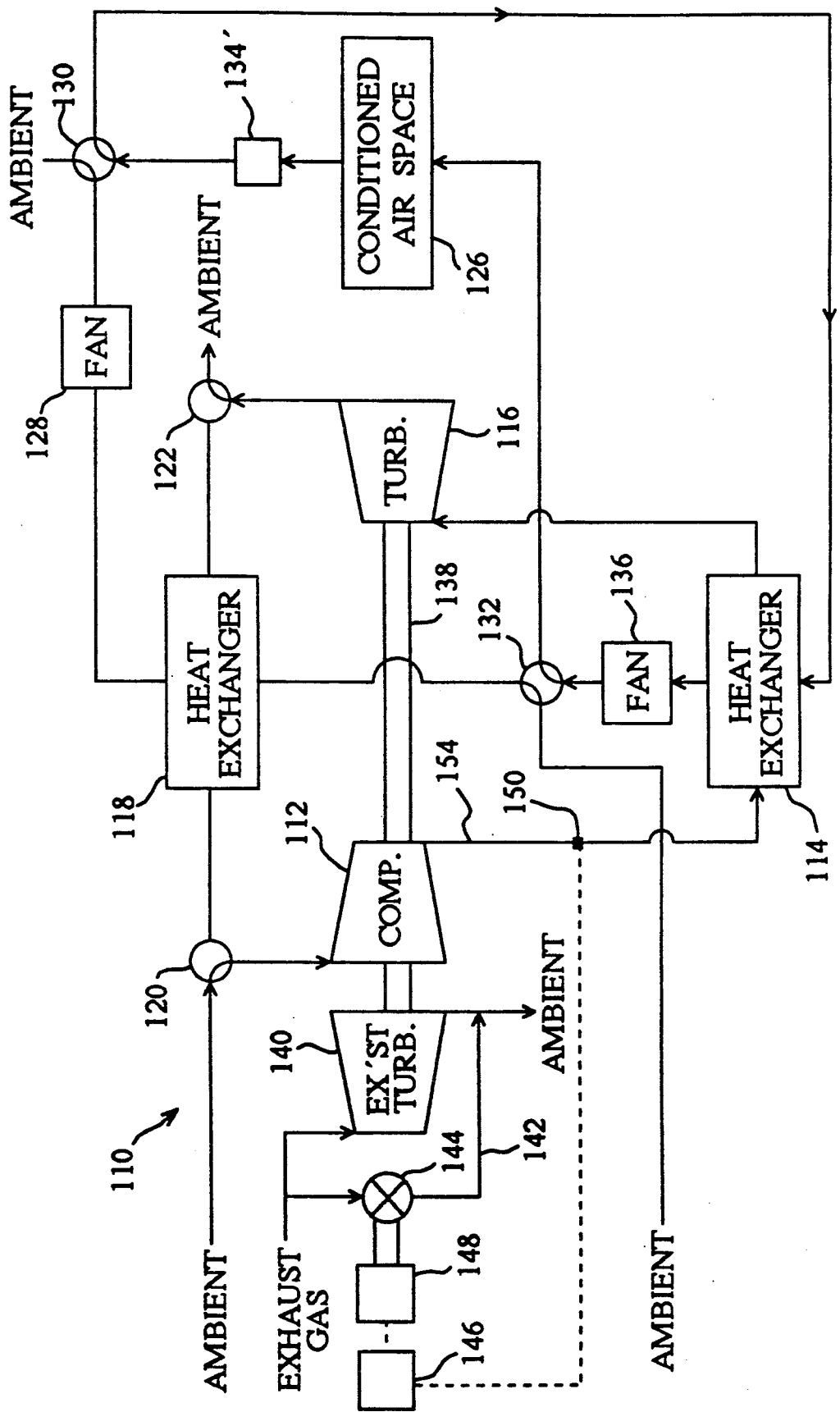
FIG. 15 is a schematic diagram of the air cycle air conditioning system of FIG. 13 in heating mode.

FIG. 15 is a schematic diagram of the air conditioning system of FIG. 13 switched to operate in heating mode. Switching to heating mode is achieved simply by altering the settings of the valves 120, 122, 130 and 132 as appropriate. As before the working air passes through valve 120, the compressor 112, the high pressure side of the compression air heat exchanger 114, the turbine 116 and valve 122 but in this case, the air is taken from ambient and flows in an open loop, being ducted back to ambient on passing through valve 122. In this way any ice which develops due to the low temperature at turbine exit is expelled from the system, and the moisture removal device 124 is therefore not utilized. The conditioning air is driven around a closed loop by fan 136. The air is drawn from the conditioned air space 126 and passes, via valve 130, through the low pressure side of the compression air heat exchanger 114 where heat is absorbed from the compressed working air stream. The heated conditioning air then returns to the conditioned air space 126 via the fan 136 and valve 132. Humidity is controlled by means of the moisture removal device 134' positioned between the conditioned air space 126 and valve 130. Heat exchanger 118, fan 128 and moisture removal device 134, are not utilized in this mode since the conditioning air is isolated from the working air by heat exchanger 114. As in the cooling mode, if fresh air rather than recirculated air is required for conditioning, it is a simple matter for conditioning air to be ducted in from ambient and subsequently returned to ambient in an open loop. However, humidity control is again substantially reduced.

In certain applications cooling will be the primary duty of the air conditioner 10, for instance, in the automotive industry where heating can be provided from the engine heat loss using well established methods. In such cases it will be appreciated that the air conditioner 110 may be modified to operate in cooling mode only, thereby simplifying the embodiment of FIG. 13, by eliminating the two-way valves 120, 122, 130 and 132, and the moisture removal device 134'.

Figure 16:
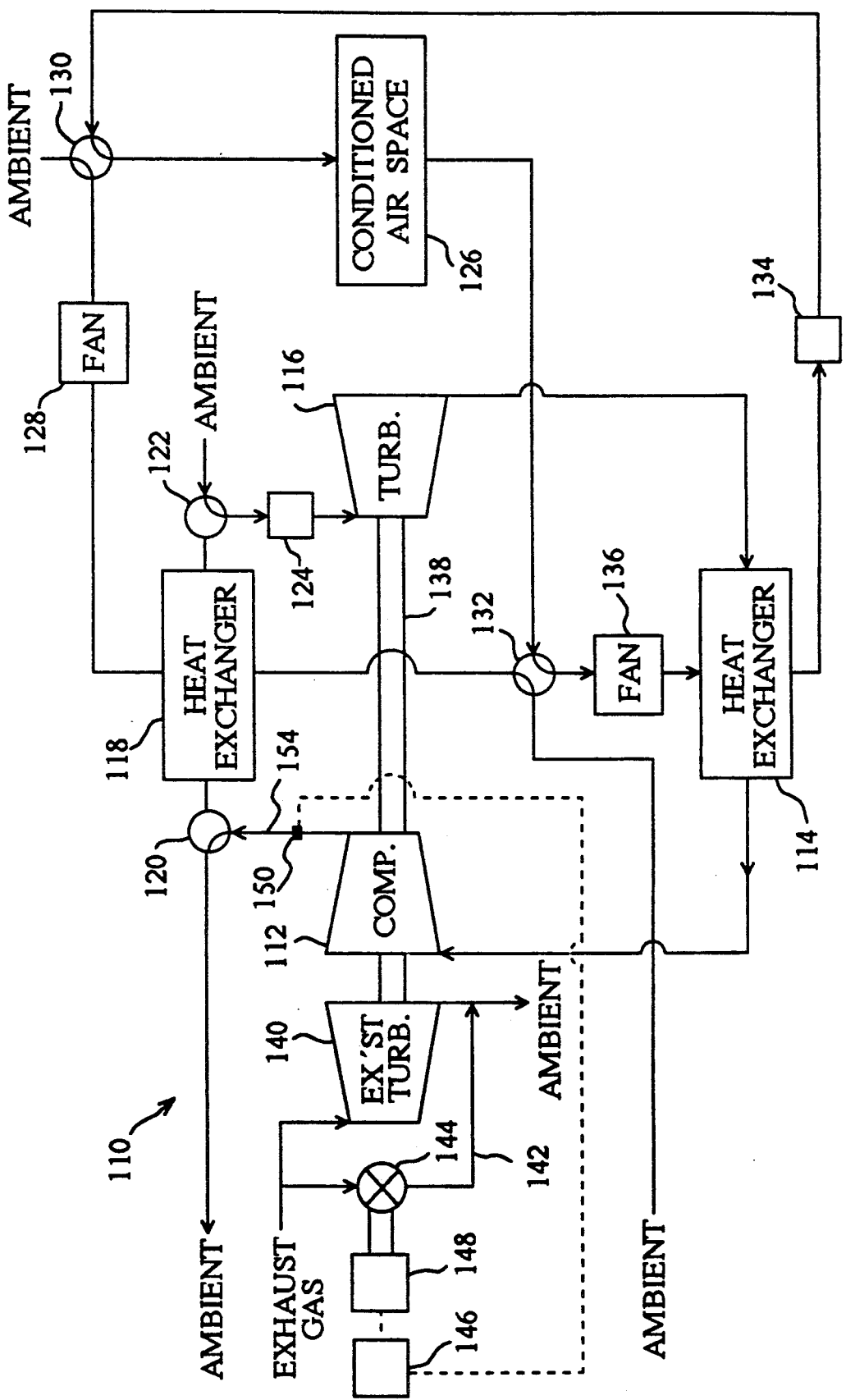
FIG. 16 is a schematic diagram of an exhaust driven, reverse flow air cycle air conditioning system according to the invention for cooling a load air space using air in a dry, closed loop.
Figure 17:
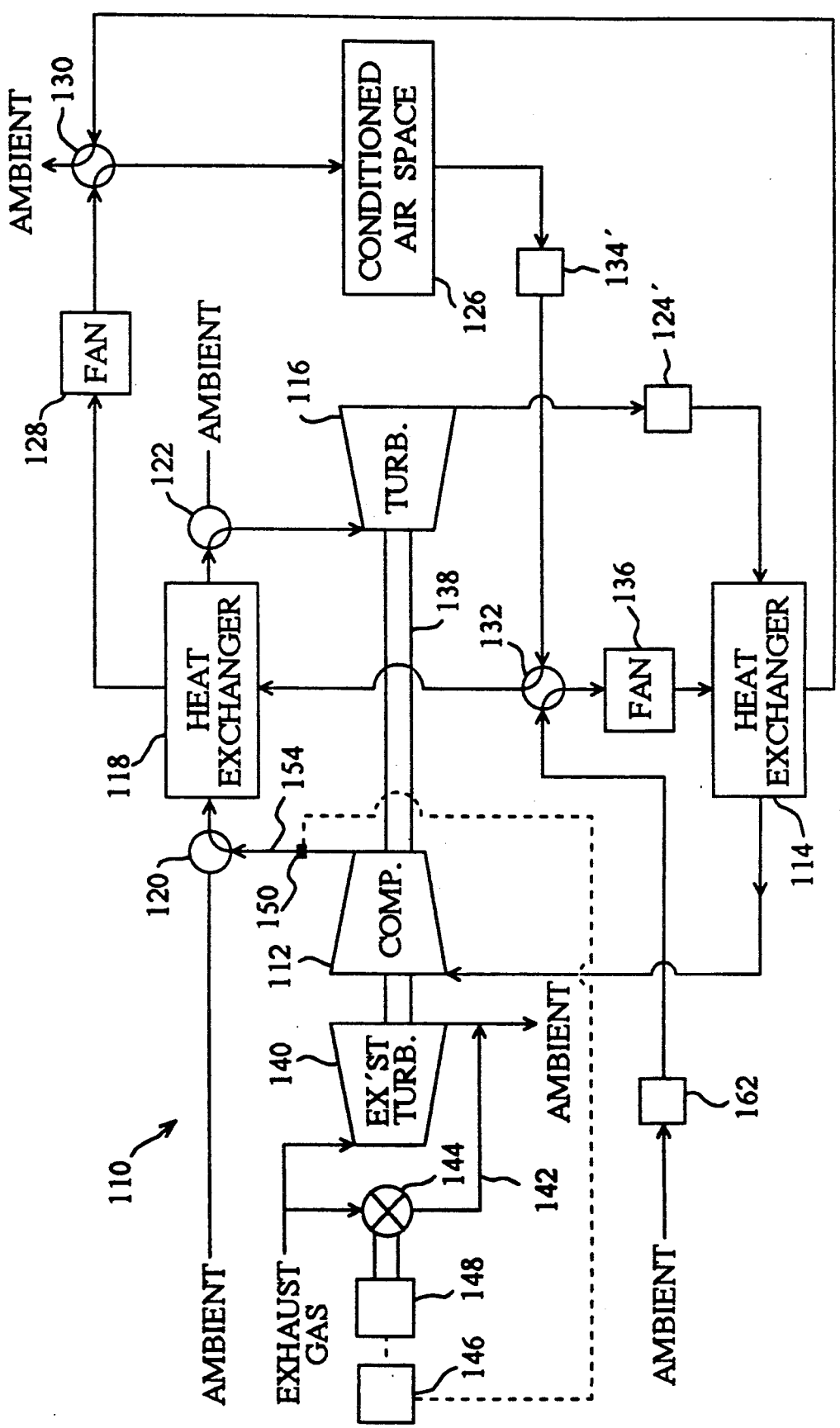
FIG. 17 is a schematic diagram of the reverse flow air cycle air conditioning system of FIG. 16 in heating mode.

FIGS. 16 and 17 show an embodiment of the air cycle air conditioning system 110 in which the majority of the components are the same as for FIGS. 13 and 15 but in which the flow direction of the working air is reversed. This has the effect of significantly improving the coefficient of performance of the system 110. In FIGS. 16 and 17 the heat exchanger 114 is the expansion air heat exchanger and the heat exchanger 118 is the compression air heat exchanger.

FIG. 16 is a schematic diagram of the reverse flow air conditioner 110 in cooling mode. As with the embodiment of FIG. 13 the working air flows in a circuit comprising a compressor 112, compression air heat exchanger 114 and turbine 116 but in this case, it is open loop with air being drawn from, and returned to, ambient. As mentioned, the working air enters the turbine 116 from ambient via valve 122 and a moisture removal device 124. In the turbine 116 it is expanded to sub-atmospheric pressure and is thus cooled. It then passes through the expansion air heat exchanger 114, where it absorbs heat from the conditioning air, and on to the compressor 112 to be compressed back to ambient pressure and finally ducted back to ambient via valve 120. The moisture remover 124 is required to prevent ice from forming in the heat exchanger 114.

The conditioning air is drawn from the conditioned air space 126 by a fan 136 and passes, via valve 132 and said fan, through the ambient pressure side of the expansion air heat exchanger 114 thereby rejecting heat to the working air. It then returns to the conditioned air space 126 via a moisture removal device 134 and a valve 130. The moisture remover 134 allows humidity control of the conditioning air closed loop. As with the embodiments of FIGS. 13 and 15, ambient air may be used as the conditioning air in an open loop but humidity control is again restricted. Heat exchanger 118 and fan 128 are not utilized in this mode since the conditioning air is isolated from the working air by heat exchanger 114.

FIG. 17 is a schematic diagram of the reverse flow air conditioner 110 of FIG. 16 in heating mode. The device is switched to heating mode by altering the settings of the two-way valves 120, 122, 130 and 132 as appropriate. The working air flows in a closed loop comprising: the turbine 116 in which it is expanded to sub-atmospheric pressure and thus cooled; the expansion air heat exchanger 114 in which heat is absorbed from an ambient air stream; the compressor 112 which compresses the air back to its original pressure and thus heats the air, the compression air heat exchanger 118 in which heat is rejected to the conditioning air stream; two two-way valves 120 and 122 which are adjusted such that they maintain the working air closed loop; and a moisture removal device 124' positioned between the turbine 116 and the heat exchanger 114 to prevent ice from forming in the heat exchanger 114. The moisture removal device 124 between the two-way valve 122 and the turbine 116 is not used in the heating mode.

The conditioning air also circulates in a closed loop, in this case driven by an electrically powered fan 128. The air leaves the conditioned via space 126 and passes through a moisture removal device 134' for humidity control, and a valve 132 before entering heat exchanger 118 where it absorbs heat from the working air stream. The heated conditioning air then returns to the conditioned air space 126 via fan 128 and valve 130. The ambient air stream i fed through the essentially ambient pressure side of the expansion air heat exchanger 114 by means of a second electrically powered fan 136 and via valve 132. Heat is rejected to the working air stream within the expansion air heat exchanger 114 and the ambient air is then ducted back to ambient via valve 130. In the reverse flow embodiments, sub-zero temperatures are encountered at the expansion air heat exchanger 114 for a wide range of ambient and operating conditions. A third moisture removal device 162 is therefore positioned in the ambient air stream prior to the valve 132 in order to avoid ice formation in said heat exchanger 114.

As with the previous embodiments, ambient air may be used as the conditioning air in an open loop but humidity control is again restricted. As mentioned previously, in certain applications, cooling will be the primary duty of the air conditioner 110, e.g. in automotive systems. In such cases, it will be appreciated that the air conditioner 110 may be modified to operate in cooling mode only, thereby simplifying the embodiment of FIG. 4 by eliminating the compression air heat exchanger 118, the fan 128 and the two-way valves 120, 122, 130 and 132.

It has been mentioned that in both the cooling and heating reverse flow embodiments, sub-zero temperatures are encountered at the heat exchanger 114 for a wide range of ambient and operating conditions. Therefore, despite the presence of moisture removers, it is likely that gradual icing of the heat transfer surfaces of the heat exchanger 114 will occur, thus impairing its performance.

Figure 18:
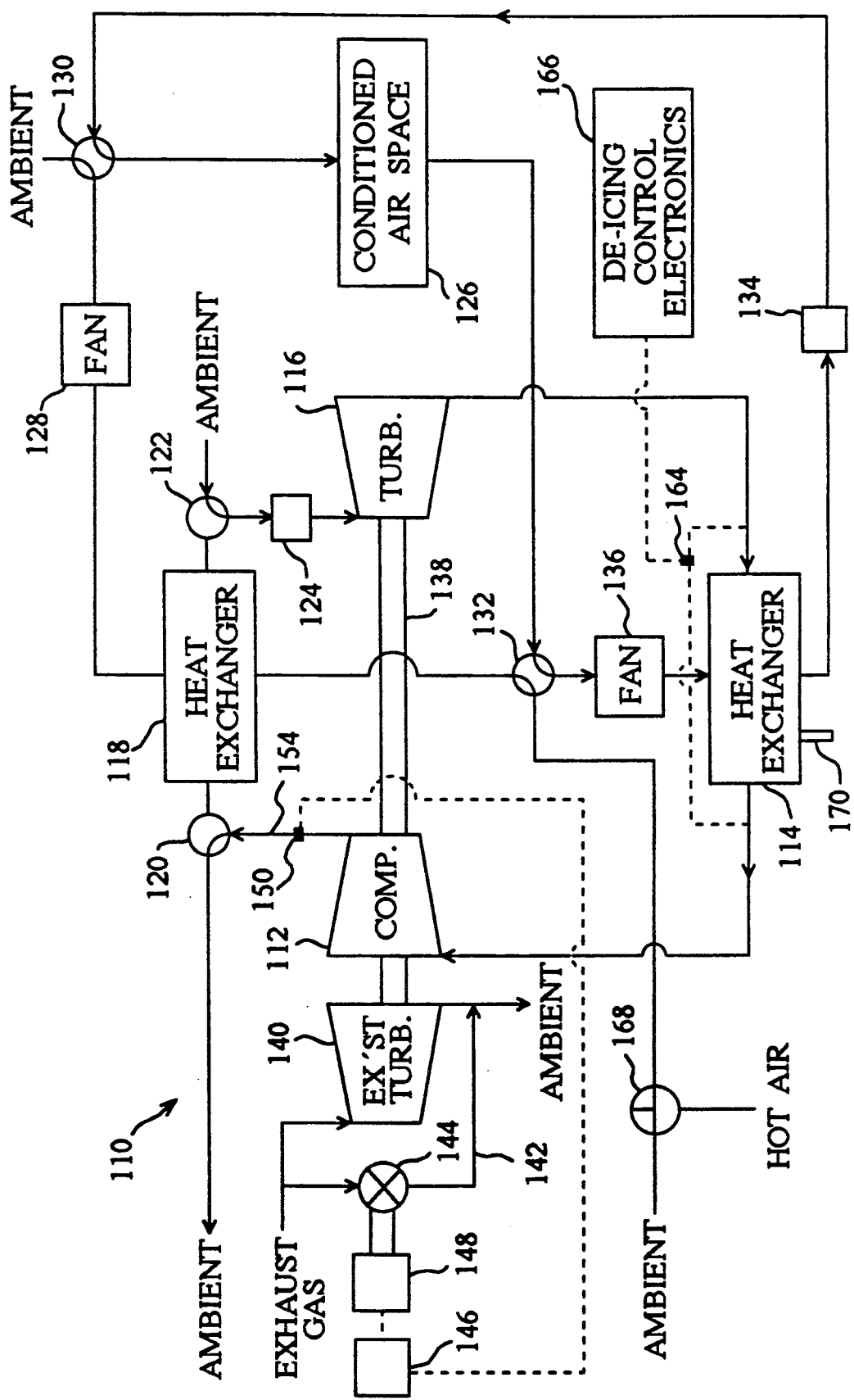
FIG. 18 is a schematic diagram of the reverse flow air cycle air conditioning system of FIG. 16 with the addition of a cooling mode heat exchanger de-icing facility associated with the expansion air heat exchanger.

FIG. 18 shows the reverse flow cooling mode embodiment of FIG. 16 modified to incorporate a de-icing facility and thereby alleviate this problem. Under normal circumstances operation of the air conditioner 110 is as described for FIG. 16. In this case, however, the pressure drop across the working air side of the expansion air heat exchanger 114 is measured by a pressure difference sensor 164 which communicates with the de-icing control electronics 166; the pressure drop is measured on the working air side since this will be more susceptible to icing, being an open loop. If, due to the formation of ice, the pressure drop increases to a factory-set level then the control electronics 166 switch the main cycle off and cause the settings of valves 130, 132 and 168 to be altered such that air is driven, by the fan 136, from a source of hot air, through the heat exchanger 114, via valves 168 and 132 and the fan 136, and on to ambient via valve 130. In this way the hot air de-ices the expansion air heat exchanger 114 and the resultant water leaves said heat exchanger via a drain 170. The source of hot air will depend on the application, for instance, air from around the exhaust manifold might be used in an automotive application. Operation in de-icing mode continues for a factory-set time period sufficient to complete de-icing, after which the control electronics 166 switch the system back to normal mode.

Figure 19:
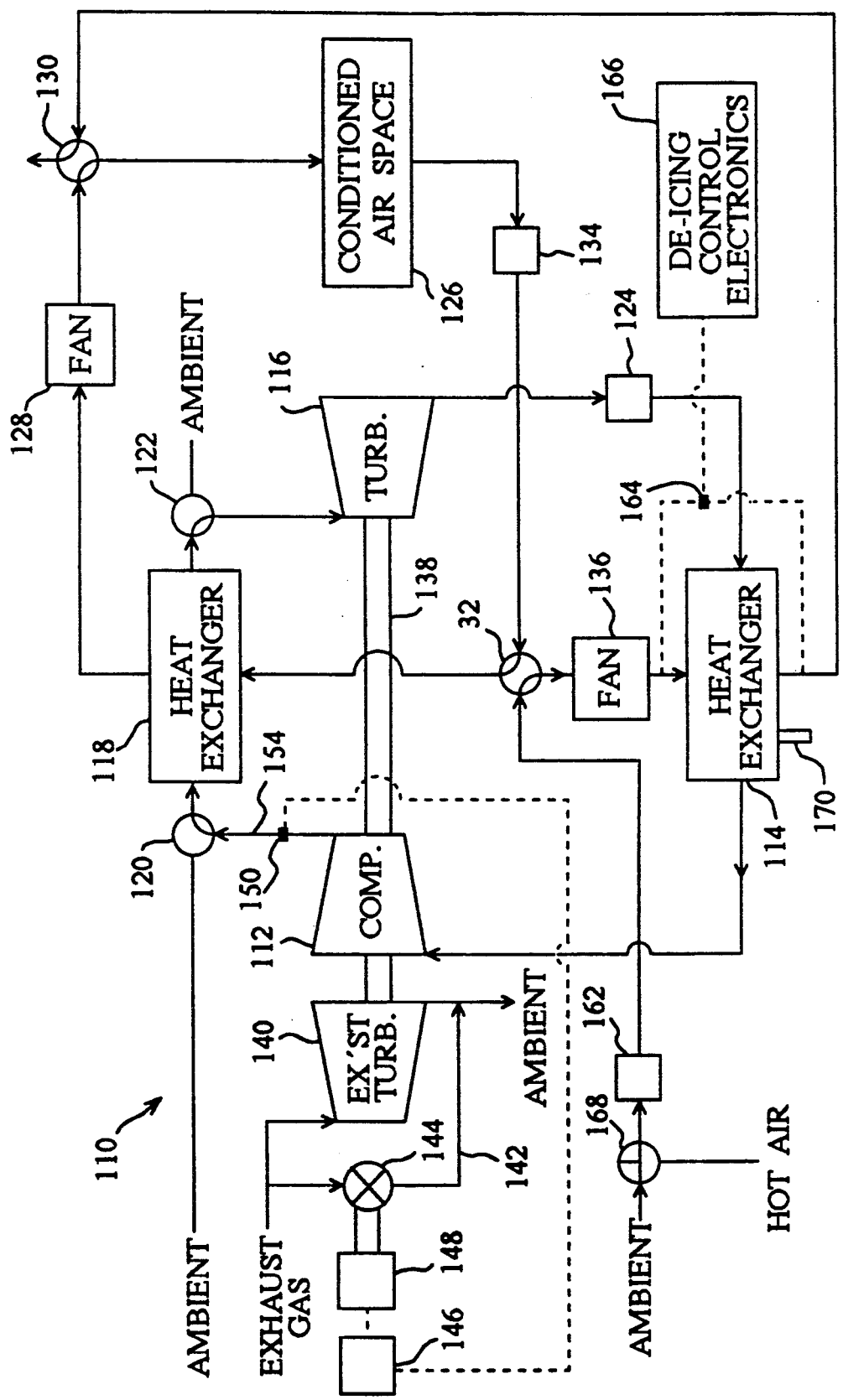
FIG. 19 is a schematic diagram of the reverse flow air cycle air conditioning system of FIG. 17 with the addition of a heating mode heat exchanger de-icing facility associated with the expansion air heat exchanger.

FIG. 19 shows the reverse flow heating mode embodiment of FIG. 17 also modified to incorporate a de-icing facility. The modifications and operation of the facility are essentially the same as those described for FIG. 18. However, in this case it is only necessary for valve 168 to be altered when switching to de-icing mode, and the pressure drop is measured across the ambient air side of the heat exchanger 114 since in this embodiment it will be most susceptible to icing.

Figure 20:
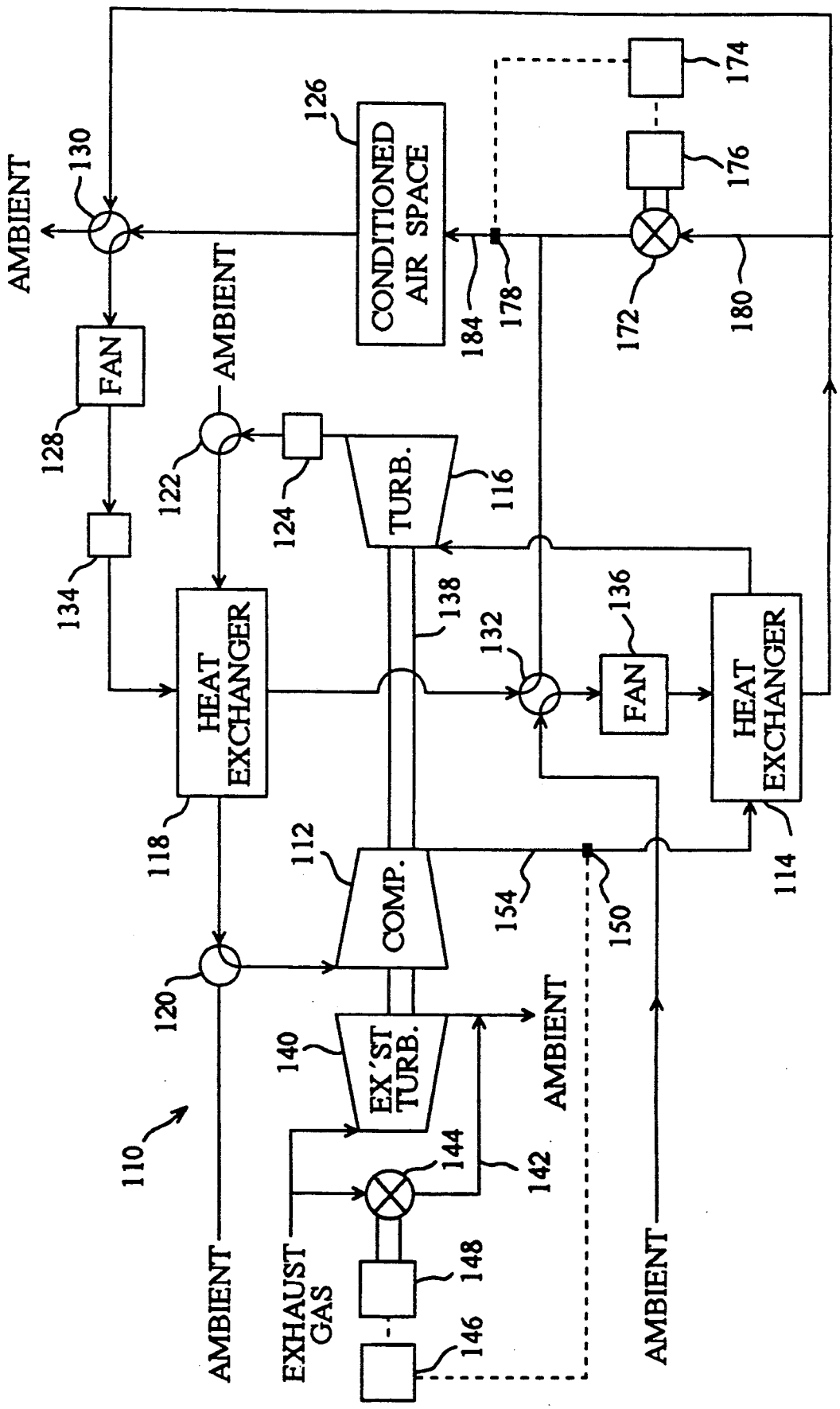
FIG. 20 is a schematic diagram of the air conditioning system of FIG. 13 modified to allow control over the air delivery temperature.

FIG. 20 shows the embodiment of FIG. 13 modified to allow a greater degree of control over the conditioned air. The addition of a control valve 172, valve controller 174, valve actuator 176, temperature sensor 178 and extra duct 180 allows a controlled amount of air to be diverted from the hot stream leaving the ambient pressure side of the heat exchanger 114 and mixed, via the duct 180, with the cold air being delivered to the conditioned air space 126. In this way the temperature at which the conditioning air is delivered can be adjusted.

Figure 21:
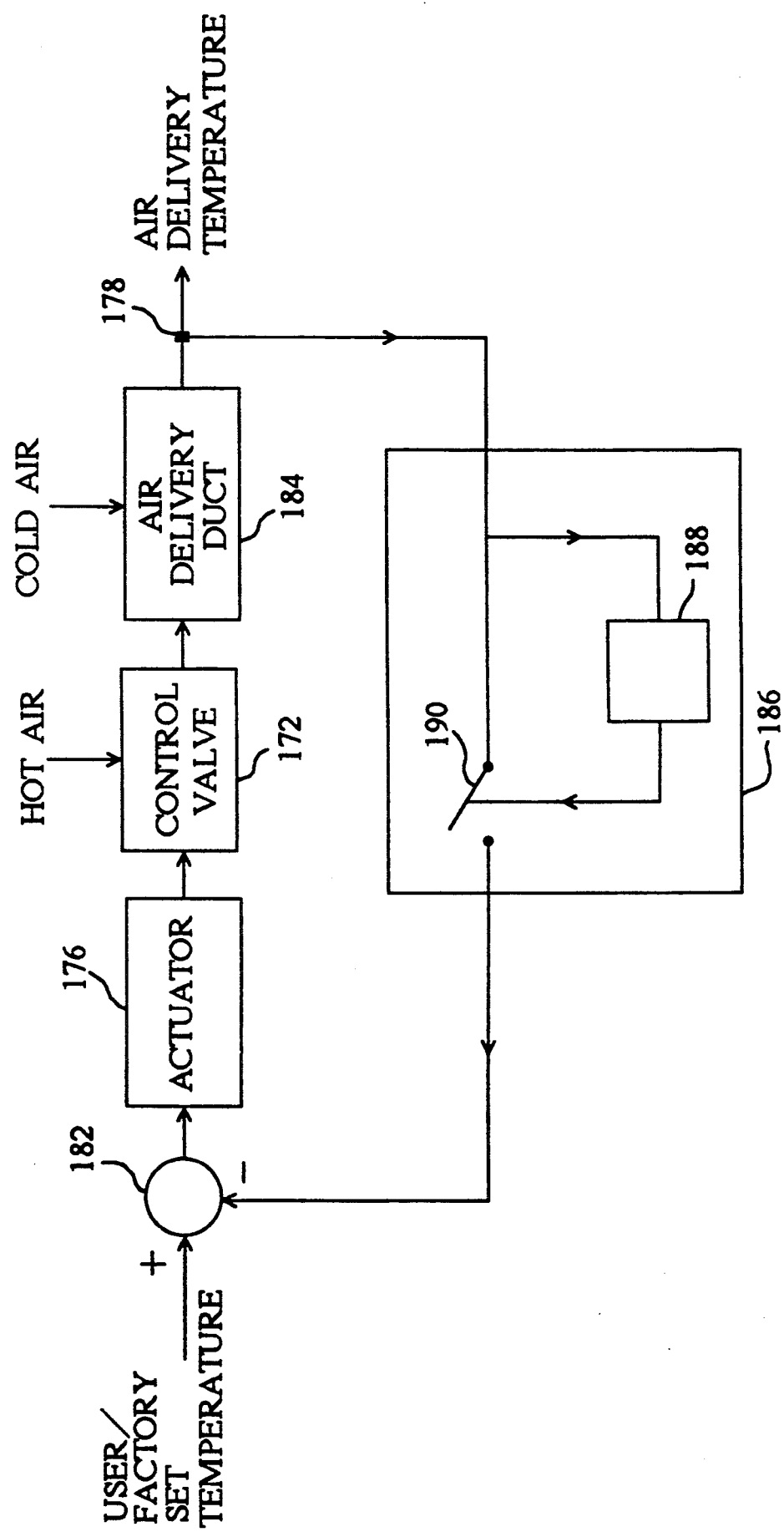
FIG. 21 is a block diagram of the preferred control system necessary to obtain the desired air delivery temperature from the air conditioning system of FIG. 20.

FIG. 21 is a block diagram of the preferred additional control system for implementing the air delivery temperature control described for the embodiment of FIG. 20. The desired air delivery temperature may be input by the user but would normally be factory-set. A negative feedback summer 182 compares the set temperature with that measured by the temperature sensor 178 positioned in the air delivery duct 184, and adjusts the valve 172 by means of the actuator 176 thereby altering the amount of hot air diverted through the duct 180. The air delivery temperature is adjusted in this way until it lies within a temperature band defined in the feedback circuit 186 by a high/low threshold crossing detector 188. Once the measured temperature lies within this band, a switch 190 is opened to nullify the feedback and hence maintain the current setting of the control valve 172. If the temperature subsequently moves out of the band, for instance, due to a sufficient change in car engine conditions, then the switch 190 is again closed and adjustment of the valve 172 resumes.

It will be clear to those skilled in the art that control of the air delivery temperature in this way may be applied to all of the air conditioner embodiments described previously, with slight modifications determined by the appropriate point from which hot or cold air should be diverted.

Under certain conditions, for instance, during idling in automotive applications, it is possible that the energy available in the exhaust gas will be insufficient to drive the air conditioner 110 at or near the design point.

Figure 22:
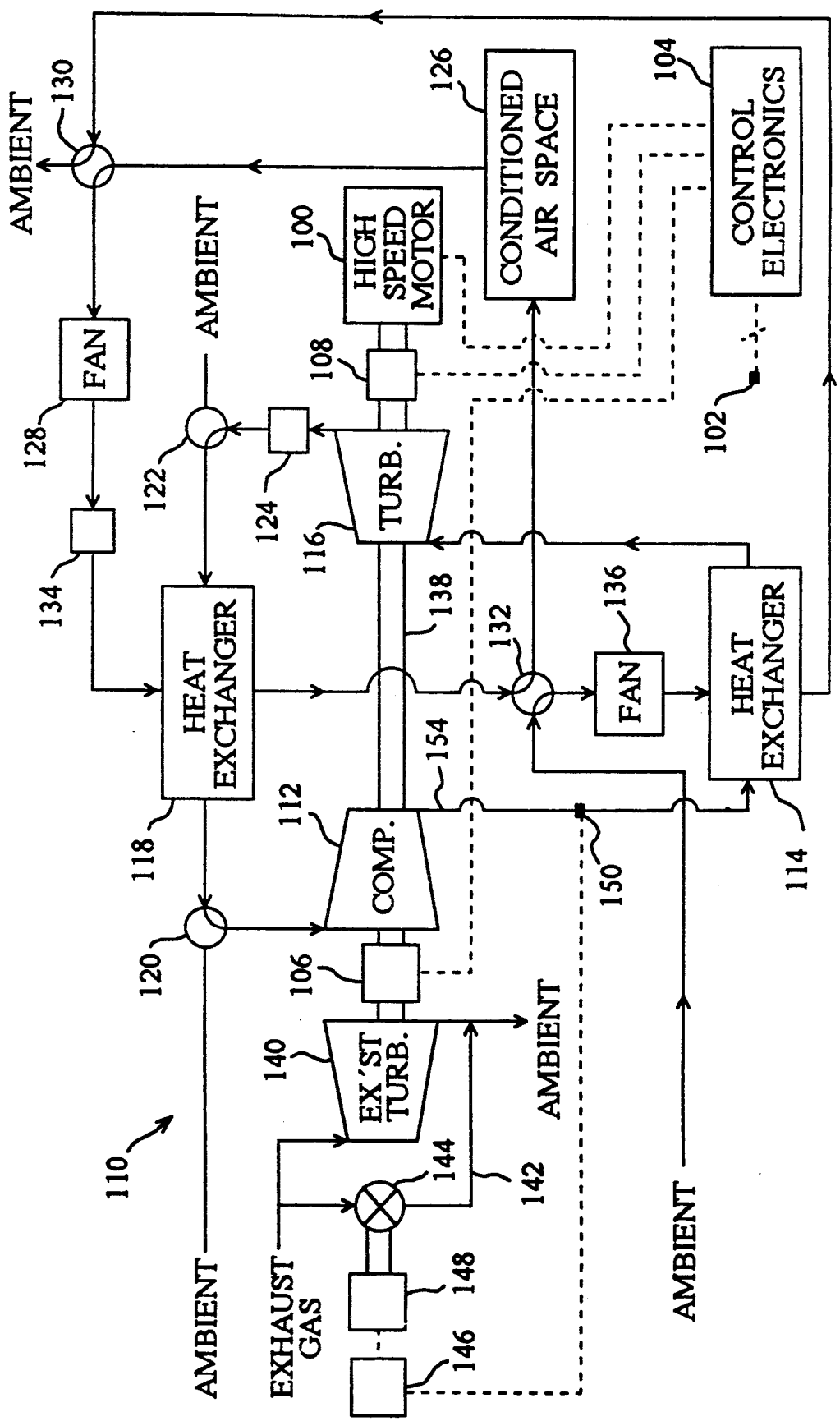
FIG. 22 is a schematic diagram of the air conditioning system of FIG. 13 modified to incorporate a high speed motor, in addition to the exhaust gas drive, for use under conditions of low exhaust gas energy.

FIG. 22 shows the embodiment of FIG. 13 modified in such a way as to overcome this problem. In addition to the exhaust turbine drive described for FIG. 13, an electrically driven high speed motor 100 of the type described in British Patent Application No. 2217118A is incorporated as an alternative means of power input for use under low exhaust energy conditions; the use of a high speed motor of this type significantly reduces the size of the rotating components relative to those of a similar device powered by a more conventional motor. A sensor 102 is used to monitor a suitable parameter chosen as a measure of the energy capacity of the exhaust gas, for instance, engine rotational speed in automotive applications, and communicates with the control electronics 104.

While sufficient exhaust energy is available adequately to drive the air conditioner 110, the exhaust turbine 140 is coupled to the shaft 138 by means of the shaft coupling 106 and the system operates as described for FIG. 1. However, if the available energy falls below a factory-set minimum, as measured by the sensor 102, the control electronics 104 decouple the exhaust turbine 140 by deactivating shaft coupling 106, and couple the high speed motor 100 to the shaft 138 by activating shaft coupling 108; electrical power input to the high speed motor 100 is also initiated. The control electronics 104 maintain the high speed motor 100, and hence the turbine 116 and compressor 112, at constant design speed until such time as the energy capacity of the exhaust gas rises sufficiently for the control electronics 104 to switch the system back to exhaust turbine drive.

It will be clear to those skilled in the art that the drive arrangement described for FIG. 22 may also be incorporated in all of the air conditioner embodiments described previously with respect to FIGS. 13-21.

In the following embodiments at least one additional compressor is provided.

Figure 23:
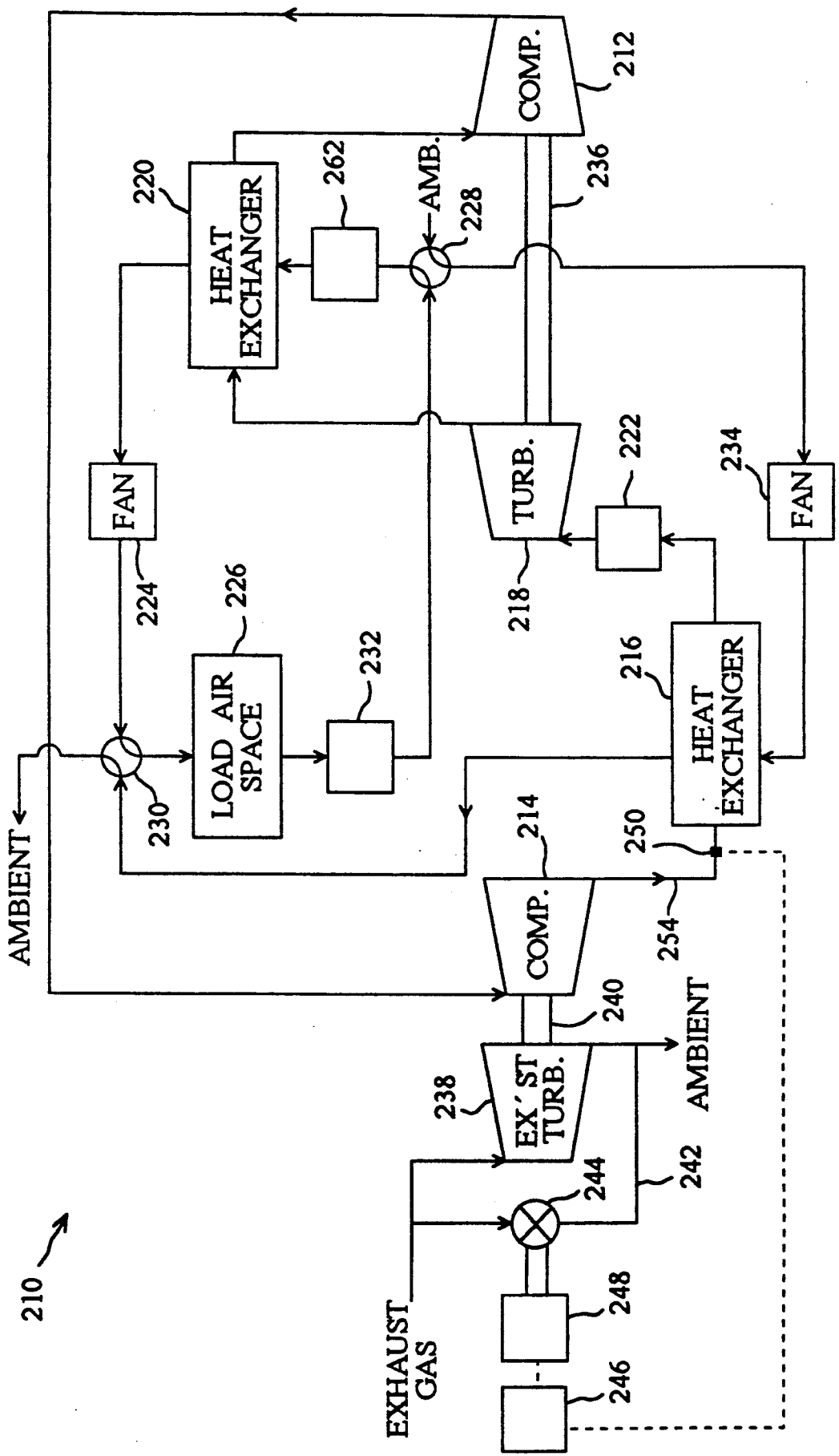
FIG. 23 is a schematic diagram of an exhaust driven air cycle air conditioning system according to the invention for cooling a load air space using air in a dry, closed loop.

FIG. 23 is a schematic diagram of an air cycle air conditioning system 210 according to the invention in cooling mode. The working air flows in a closed loop comprising: an initial compressor 212 which raises the temperature and pressure of the air; a second compressor 214 which further raises the working air temperature and pressure; a compression air heat exchanger 216 in which heat is rejected to an ambient air stream; a turbine 218 in which the compressed and cooled air is expanded back to its original pressure; an expansion air heat exchanger 220 in which heat is absorbed from the conditioning air stream; and a moisture removal device 222 positioned between the heat exchanger 216 and the turbine 218 to prevent ice from forming in the heat exchanger 220.

The conditioning air also flows within a closed loop under the action of an electrically driven fan 224. It is drawn from the load air space 226 and passes through the expansion air heat exchanger 220 via a two-way valve 228. Heat is rejected to the working air stream within the heat exchanger 220 and the cooled conditioning air returns to the load air space 226 via the fan 224 and another two-way valve 230. Conditioning air humidity is controlled by means of a moisture removal device 232 positioned between the load air space 226 and heat exchanger 220.

The ambient air stream is fed through the low pressure side of the compression air heat exchanger 216 by means of a second electrically powered fan 234 and via valve 228. It absorbs heat from the working air stream within the heat exchanger 216 and is then ducted back to ambient via valve 230.

A third moisture removal device 262, between the two-way valve 228 and heat exchanger 220, is not used in the cooling mode of the system but is described below in connection with the system in heating mode.

In passing through the turbine 218 the working air does work which is transferred via a shaft 236 to provide the power requirement of the initial compressor 212. Power input to the system 210 is via the second compressor 214 which is driven by an exhaust turbine 238 mounted on the same shaft 240 as the compressor 214. The exhaust turbine 238 is in turn driven by exhaust gas from a suitable source, for instance, a car exhaust. The exhaust turbine 238 is designed to operate at high rotational speed thereby reducing the size of the rotating components for a given duty, and hence resulting in a compact air conditioner 210. The amount of exhaust gas passing through the exhaust turbine 238 is controlled by means of a bypass duct 242, bypass control valve 244, valve controller 246, valve actuator 248 and pressure sensor 250 such that operation of the air conditioner 210 is maintained at or near design conditions. The preceding description of the power inputs to the compressors 212 and 214 also applies to each of the embodiments described hereafter.

Figure 24:
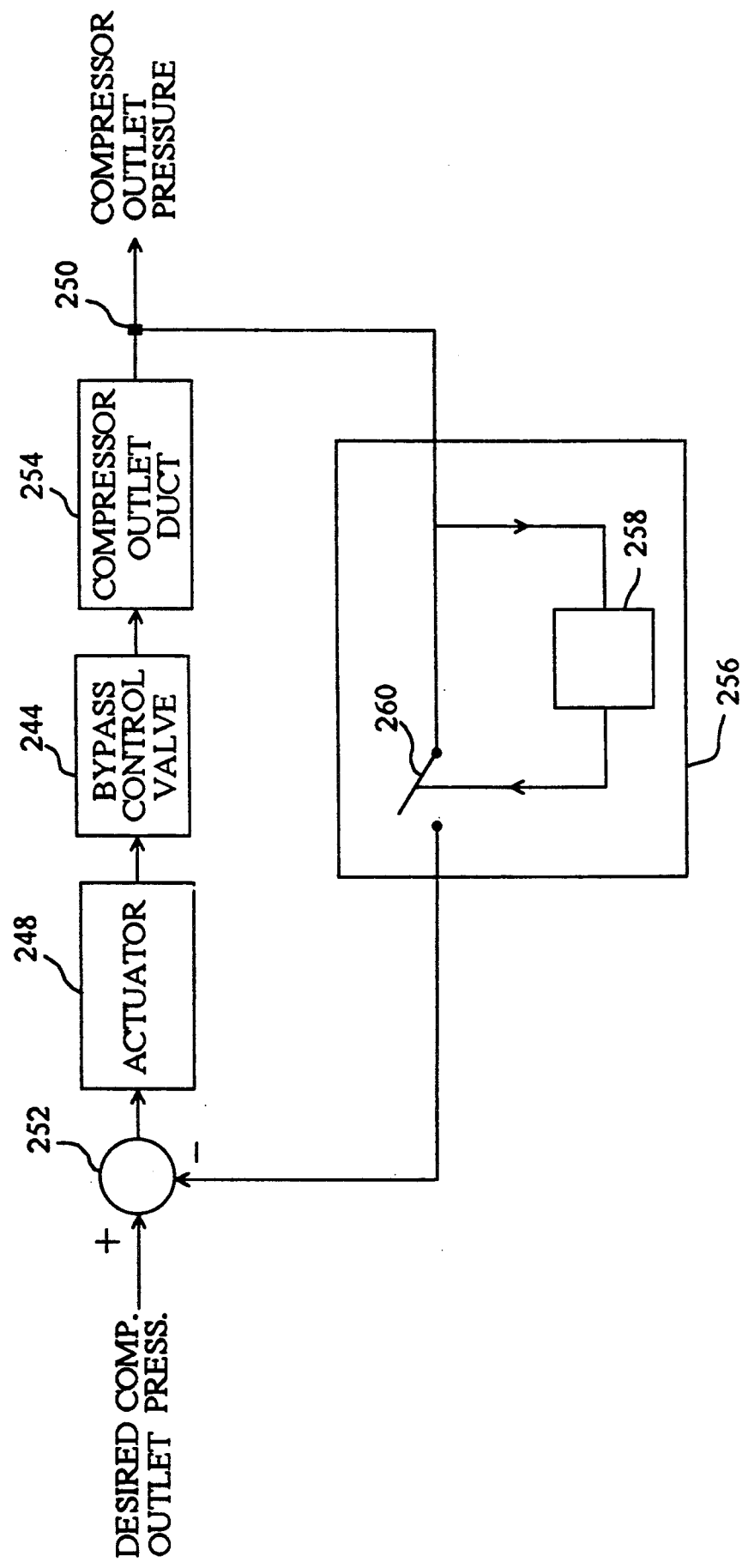
FIG. 24 is a block diagram of the preferred control system for obtaining the required power input to the air conditioning system of FIG. 23.

FIG. 24 is a block diagram of the preferred control system for achieving this. The design operating condition is factory-set in terms of a desired compressor outlet pressure which is compared, by a negative feedback summer 252, with the pressure measured by pressure sensor 250 positioned in the compressor outlet duct 254. The summer 252 adjusts the bypass control valve 244 by means of the actuator 248 thereby altering the amount of exhaust gas allowed to bypass the exhaust turbine 238. In this way the power input to the compressor 214 is adjusted until the compressor outlet pressure lies within a factory-set pressure band defined in the feedback circuit 256 by a high/low threshold crossing detector 258. Once the measured pressure lies within this band, a switch 260 is opened to nullify the feedback and hence maintain the current setting of the control valve 244. When the measured pressure subsequently moves out of the band, for instance, due to a sufficient change in car engine condition, the switch 260 is again closed and adjustment of the valve 244 resumes.

The control system described in the preceding paragraph is incorporated in all of the embodiments described hereafter. It will be appreciated by those skilled in the art that a parameter other than compressor outlet pressure, for instance, rotational speed or compression ratio, may be used as a measure of the operating condition without departing from the scope of the invention as described. It will also be appreciated that control can be facilitated at less expense using a simple mechanical link between the bypass valve 244 and sensor 250 such as those commonly used in automotive turbochargers. However, the valve setting is then limited to only two discrete settings, e.g. fully open and fully closed.

As described for FIG. 23, the conditioning air circulates in a closed loop. If it is a requirement that fresh air be supplied to the load air space 226 rather than the recirculated air of the closed loop, then it will be appreciated by those skilled in the art that it is a simple matter for ambient air to be ducted into the expansion air heat exchanger 220 via the moisture removal device 232, and for the air leaving the load air space 226 256 to be ducted back to ambient. The expansion air heat exchanger 220 ensures that the conditioning air is isolated from the working air in the event that the working air becomes contaminated due to ineffective sealing or seal failure between the exhaust turbine 238 and compressor 214.

If required, it is also possible for the working air to flow in an open loop, i.e. for ambient air to be ducted into the initial compressor 212 and back to ambient on leaving the expansion air heat exchanger 220. However, operation in this way is slightly detrimental with regard to cycle efficiency.

Figure 25:
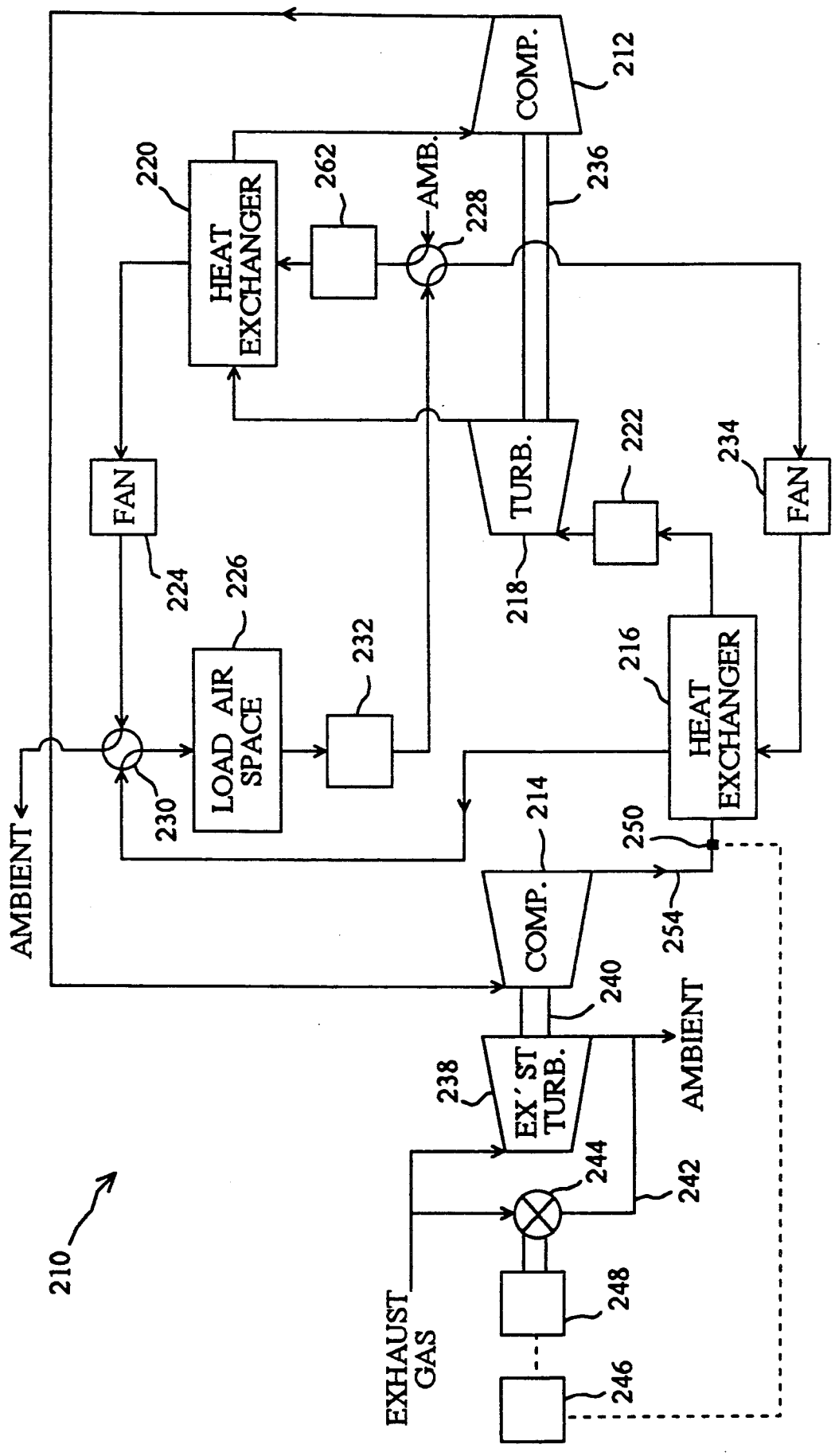
FIG. 25 is a schematic diagram of the air cycle air conditioning system of FIG. 23 in heating mode.

FIG. 25 is a schematic diagram of the air conditioning system of FIG. 23 switched to operate in heating mode; this is achieved simply by altering the settings of the two-way valves 228 and 230 as appropriate. The working air closed loop is the same as for FIG. 23 except that in this case heat is rejected to the conditioning air stream in the heat exchanger 216, and absorbed from an ambient air stream in the heat exchanger 220. The conditioning air again flows within a closed loop but in this case under the action of the electrically driven fan 234. It is drawn from the load air space 226 and passes through the low pressure side of the compression air heat exchanger 216 via the two-way valve 228 and fan 234. Heat is absorbed from the working air stream within the heat exchanger 2!6, and the heated conditioning air returns to the load air space 226 via the two-way valve 230. Conditioning air humidity is again controlled by means of the moisture removal device 232.

The ambient air stream now flows through the low pressure side of the expansion air heat exchanger 220 under the action of the fan 224 and via valve 228. It rejects heat to the working air stream within the heat exchanger 220 and is then ducted back to ambient via the fan 224 and valve 230. Under typical cold weather conditions, the temperature of the ambient air leaving the heat exchanger 220 will be sub-zero; a third moisture removal device 262 is therefore included between the valve 228 and heat exchanger 220 to prevent ice from forming in the heat exchanger 220.

As in the cooling mode, if fresh rather than recirculated air is required for conditioning, it is a simple matter for the air to be ducted in from ambient and subsequently returned in an open loop. This is also true of the working air, with the advantage that in heating mode the cycle efficiency is improved slightly by operating with the working air in an open loop.

In some applications either cooling or heating will be required but not both; for instance, in the automotive industry cooling only is required since heating can be obtained from engine heat loss using well established methods. In such cases it will be appreciated that the air conditioner 210 may be modified to operate in either cooling or heating mode only, thereby simplifying the embodiments of FIGS. 23 and 25.

Figure 26:
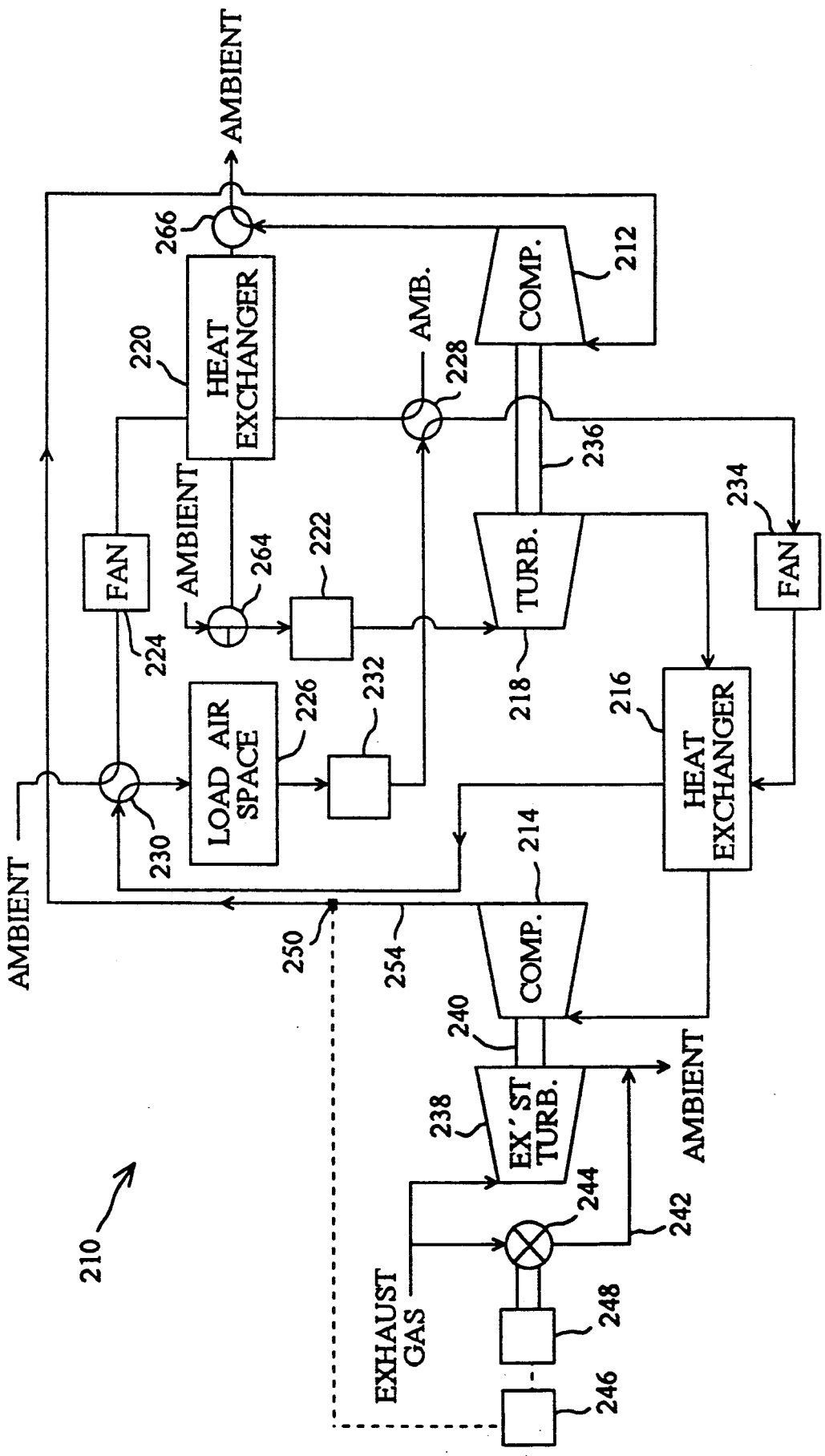
FIG. 26 is a schematic diagram of an exhaust driven, reverse flow air cycle air conditioning system according to the invention for cooling a load air space using air in a dry, closed loop.
Figure 27:
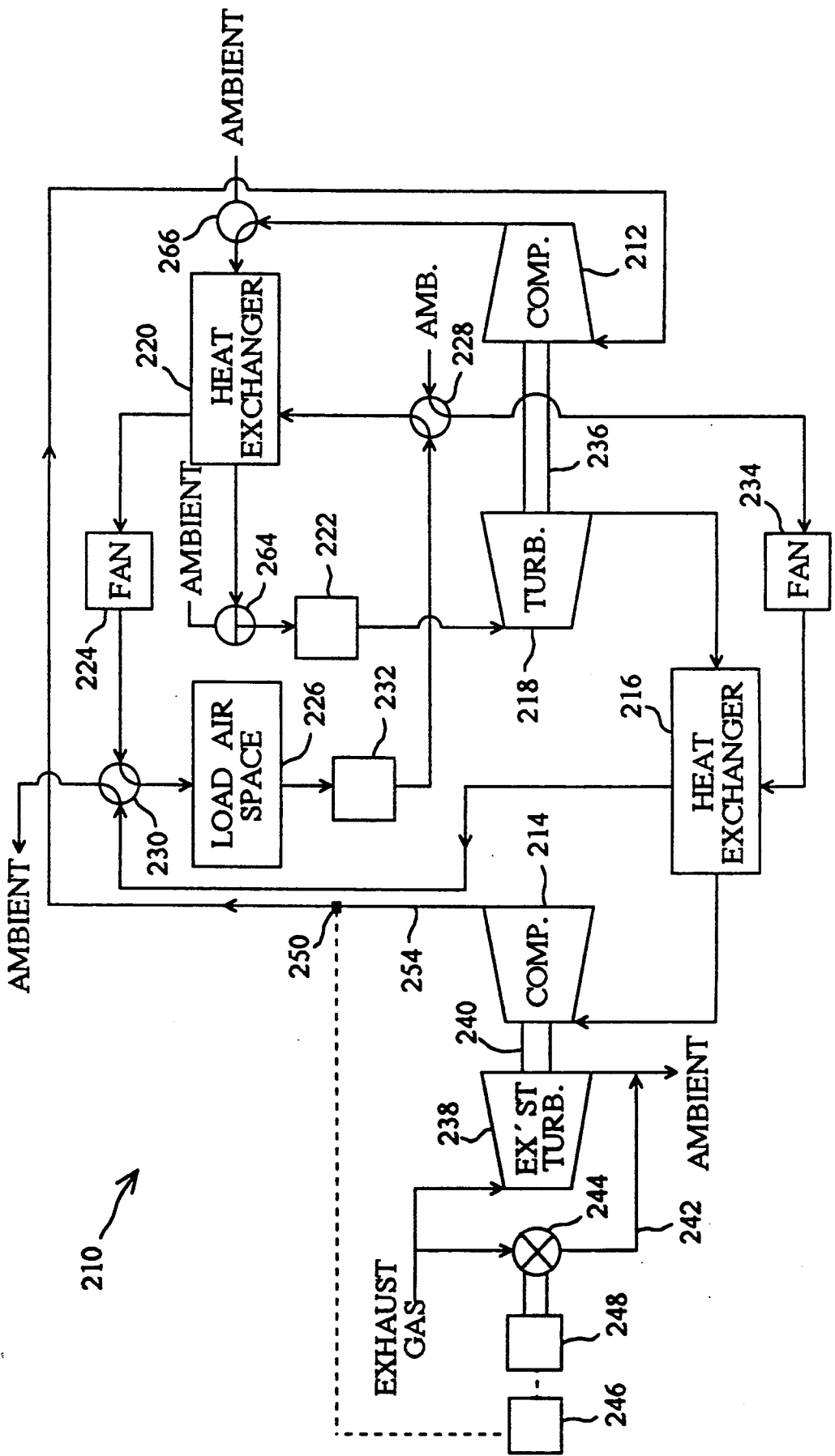
FIG. 27 is a schematic diagram of the reverse flow air cycle air conditioning system of FIG. 25 in heating mode.

FIGS. 26 and 27 show embodiments of the air cycle air conditioning system 210 in which the majority of the components are the same as for FIGS. 23 and 25, the main difference being that the flow direction of the working air is reversed. This has the effect of significantly improving the coefficient of performance of the system 210. In FIGS. 26 and 27 the heat exchanger 216 is the expansion air heat exchanger and the heat exchanger 220 is the compression air heat exchanger.

FIG. 26 is a schematic diagram of the reverse flow air conditioner 210 in cooling mode. In this case, the working air flows in an open loop since this substantially improves the system efficiency relative to operating with a closed loop. The open loop comprises; a turbine 218 which draws the air from ambient via a two-way valve 264 and a moisture removal device 222, and expands it to sub-atmospheric pressure thereby cooling it; an expansion air heat exchanger 216 in which heat is absorbed from the conditioning air stream; an initial compressor 214 which partially re-compresses the air back to ambient pressure; a second compressor 212 which completes the recompression and exhausts to ambient via a two-way valve 266. The moisture remover 222 prevents ice from forming in the heat exchanger 216.

The conditioning air flows in a closed loop under the action of an electrically driven fan 234. The air is drawn from the load air space 226 and passes through the expansion air heat exchanger 216 via moisture removal device 232, a two-way valve 228 and the fan 234. Heat is rejected to the working air stream within the heat exchanger 216 and the cooled conditioning air returns to the load air space 226 via a two-way valve 230. The moisture remover 232 is used to reduce conditioning air humidity.

As with the embodiments of FIGS. 23 and 25, it will be appreciated that fresh ambient air may be used as the conditioning air in an open loop. The heat exchanger 220 and fan 224 are not used in this embodiment, but are described below in connection with the system in heating mode.

FIG. 27 is a schematic diagram of the air conditioning system of FIG. 26 switched to operate in heating mode; this is achieved simply by altering the settings of the two-way valves 228, 230, 264 and 266 as appropriate. The working air circuit is similar to that of FIG. 26, except now the loop is closed with the air leaving the second compressor 212 being ducted through the compression air heat exchanger 220, via valve 266, and back to the turbine 218 via valve 264 and moisture removal device 222. Heat is rejected to the conditioning air stream within the heat exchanger 220, and is absorbed from an ambient air stream within the expansion air heat exchanger 216.

The conditioning air again flows in a closed loop, this time under the action of the electrically driven fan 224. The air is drawn from the load air space 226 and passes through the compression air heat exchanger 220 via the moisture removal device 232 and two-way valve 228. Heat is absorbed from the working air stream within the heat exchanger 220 and the heated conditioning air returns to the load air space 226 via the fan 224 and valve 230.

The ambient air stream flows through the expansion air heat exchanger 216 under the action of the electrically driven fan 234 and via the valve 228 and fan 234. It rejects heat to the working air stream within the heat exchanger 216, and returns to ambient via the valve 230.

Again, if fresh rather than recirculated air is required for conditioning then it is a simple matter for the air to be ducted in from ambient and subsequentially returned in an open loop. This is also true of the working air and can be achieved simply by leaving the valve 264 in the position shown in FIG. 26. However, the embodiment of FIG. 27 is preferred since operation with the working air in an open loop is slightly detrimental to cycle efficiency in this mode.

As mentioned previously, some applications will require either cooling or heating but not both. In such cases, it will be appreciated that the air conditioner 210 may be modified to operate in either cooling or heating mode only, thereby simplifying the embodiments of FIGS. 26 and 27.

Figure 28:
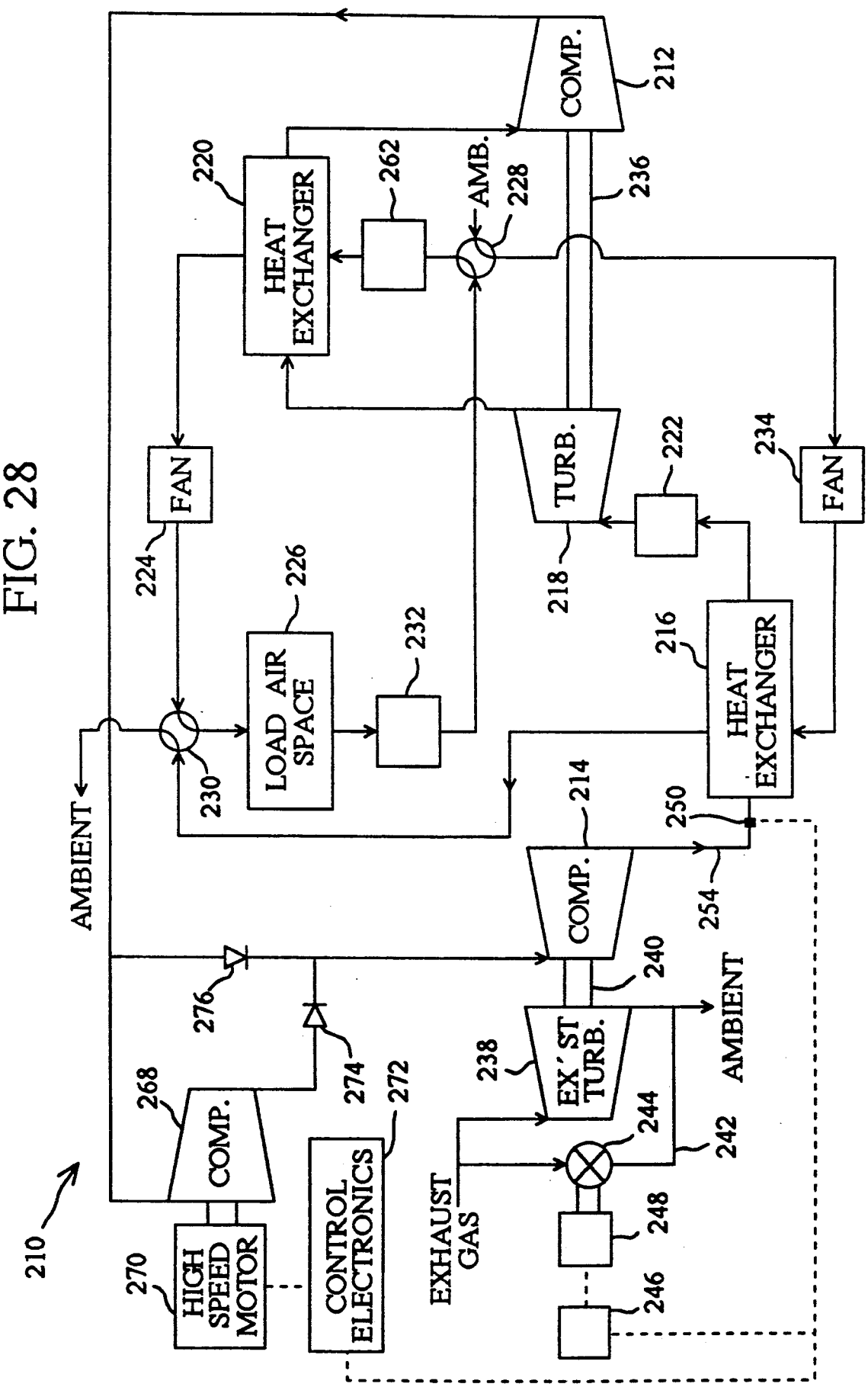
FIG. 28 is a schematic diagram of the air conditioning system of FIG. 23 modified to incorporate an extra air compressor, driven by a high speed motor, as an additional means of power input for use under conditions of low exhaust gas energy.

Under certain operating conditions, for instance during idling in automotive applications, the energy available in the exhaust gas will be insufficient to drive the air conditioner 210 at or near the design point. FIG. 28 shows the embodiment of FIG. 23 modified in order to overcome this problem. An additional compressor 268 is incorporated in the working air circuit as an extra means of power input for use under low exhaust energy conditions. The compressor 268 is driven by an electrically powered high speed motor 270 of the type described in British Patent Application No. 2217118A. Designing for high rotational speed is preferred since it significantly reduces the size of the rotating components relative to those of a similar compressor/motor arrangement powered by a more conventional motor. However, it will be appreciated that alternative methods of providing extra power input, such as a conventional motor or a supercharged compressor, may also be used to achieve the same end.

While sufficient exhaust energy is available to meet the power requirement of the air conditioner 210, the compressor 268 and motor 270 are not used and the system operates as described for FIG. 23. However, if the pressure measured by the sensor 250 at the outlet of the compressor 214 falls below a pre-set minimum, the maximum energy is being extracted from the exhaust gas, i.e. the exhaust bypass valve 244 is fully closed, then electrical power input to the high speed motor 270 is initiated by the control electronics 272. The control electronics 272 drive the motor 270, and hence compressor 268, at a speed suitable for the system to operate at or near design conditions. This continues until such time as the energy capacity of the exhaust gas rises sufficiently for the control electronics 272 to deactivate the motor 270. Two non-return valves, 274 and 276, ensure that the correct working air flow directions are maintained.

It will be appreciated that the extra means of power input described for FIG. 28 may also be incorporated in all of the air conditioner embodiments described so far.

In the reverse flow embodiments of FIGS. 26 and 27, sub-zero temperatures are encountered at the expansion air heat exchanger 216 for a wide range of ambient and operating conditions. Therefore, despite the presence of the moisture removal devices 222 and 232, it is likely that gradual icing of the heat transfer surfaces of the heat exchanger 216 will occur, thus impairing its performance.

Figure 29:
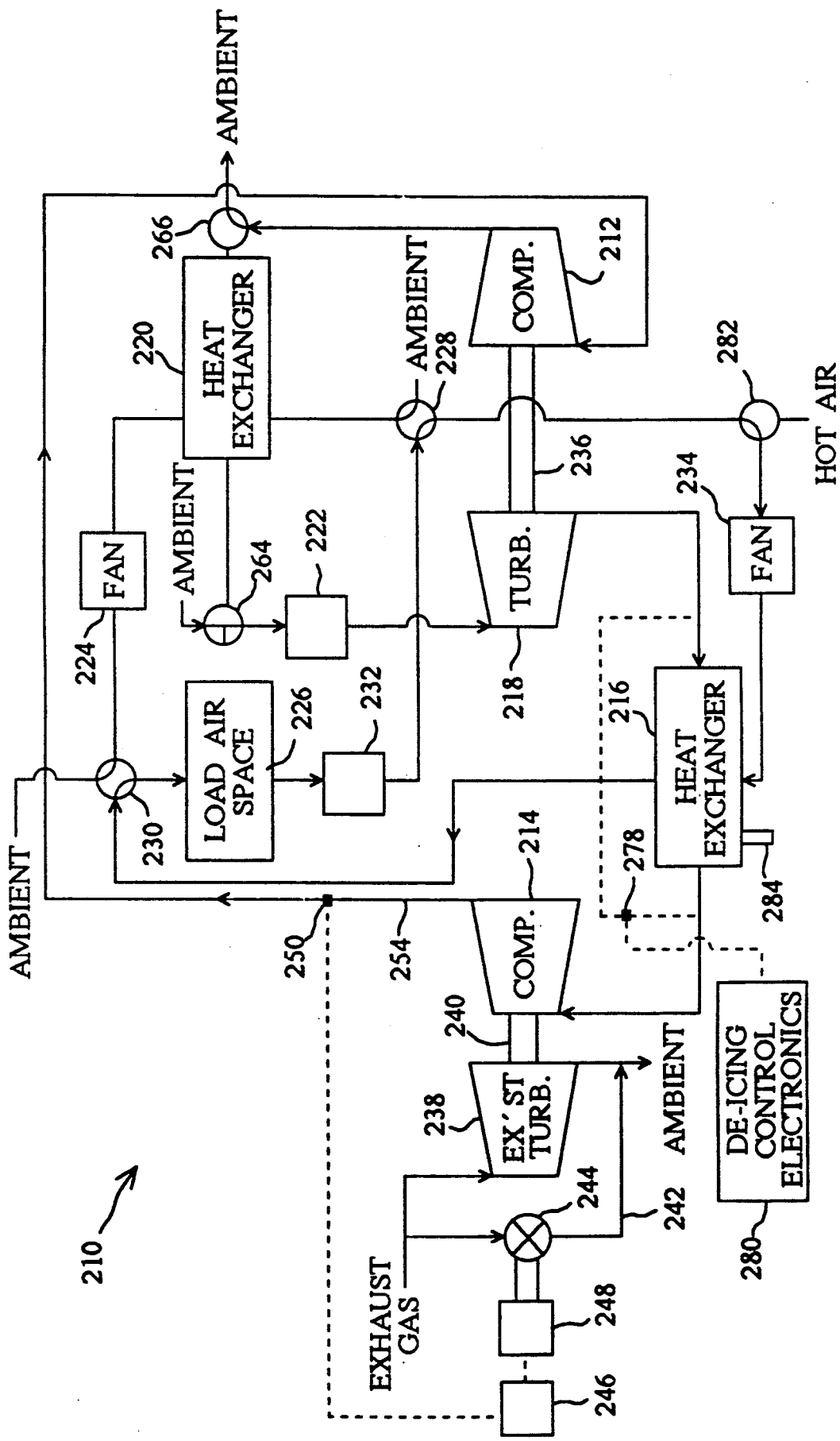
FIG. 29 is a schematic diagram of the reverse flow air cycle air conditioning system of FIG. 25 with the addition of a cooling mode heat exchanger de-icing facility associated with the expansion air heat exchanger.

FIG. 29 shows the reverse flow cooling mode embodiment of FIG. 26 modified to incorporate a de-icing facility and thereby alleviate this problem. Under normal circumstances operation of the air conditioner 210 is as described for FIG. 26. In this case, however, the pressure drop across the working air side of the expansion air heat exchanger 216 is measured by a pressure difference sensor 278 which communicates with the de-icing control electronics 280; the pressure drop is measured on the working air side since this will be more susceptible to icing. If, due to the formation of ice, the pressure drop increases to a factory-set level then the control electronics 280 switch the main cycle off and cause the settings of valves 230 and 282 to be altered such that air is driven, by the fan 234, from a source of hot air through the heat exchanger 216, via valve 282 and the fan 234, and on to ambient via valve 230. In this way the hot air de-ices the expansion air heat exchanger 216 and the resultant water leaves said heat exchanger via a drain 284. The source of hot air will depend on the application, for instance air from around the exhaust manifold might be used in an automotive application. Operation in de-icing mode continues for a factory-set time period sufficient to complete de-icing, after which the control electronics 280 switch the system back to normal mode.

Figure 30:
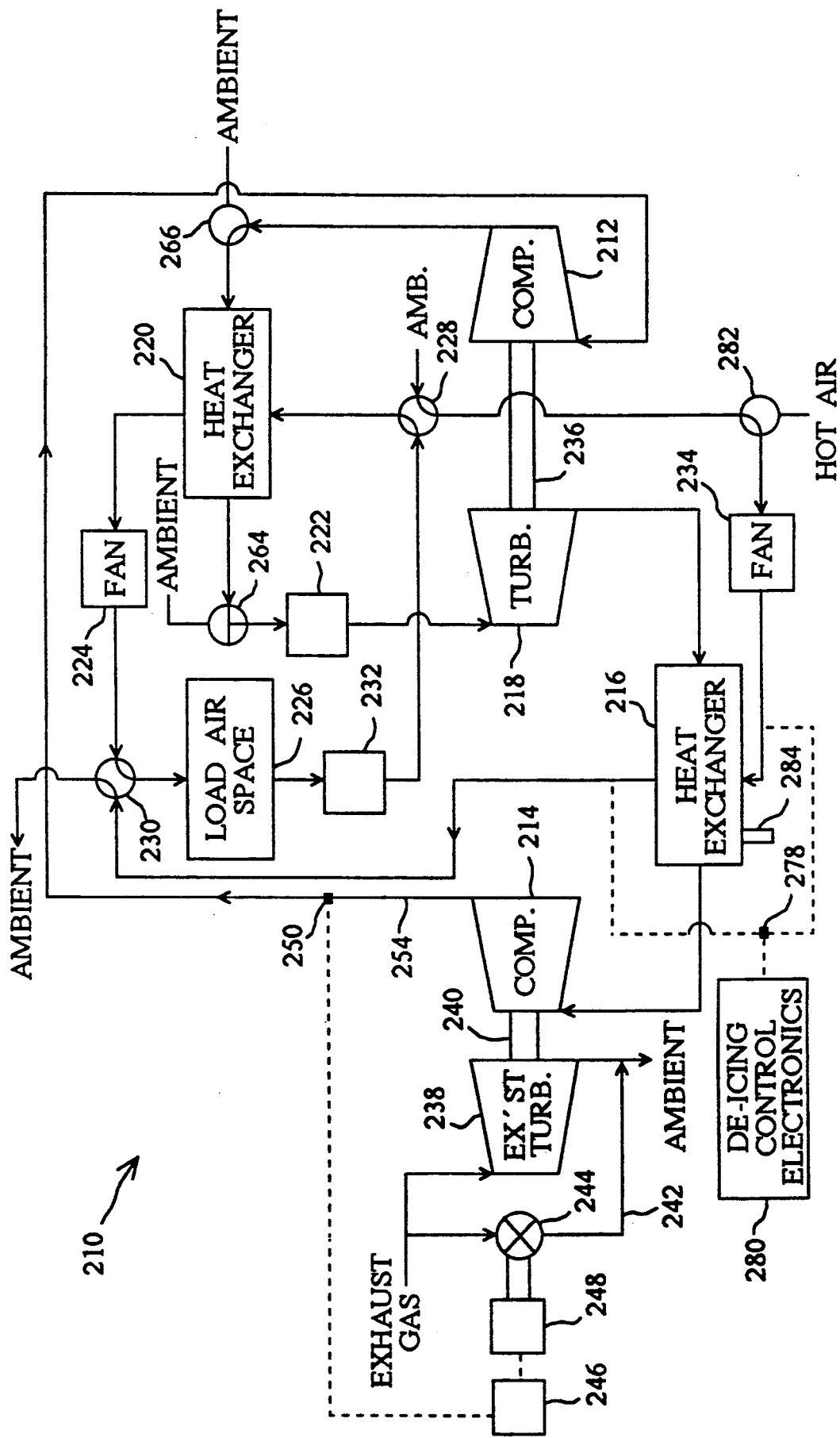
FIG. 30 is a schematic diagram of the reverse flow air cycle air conditioning system of FIG. 26 with the addition of a heating mode heat exchanger de-icing facility associated with the expansion air heat exchanger.

FIG. 30 shows the reverse flow heating mode embodiment of FIG. 27 also modified to incorporate a de-icing facility. The modifications and operation of the facility are essentially the same as those described for FIG. 29. However, in this case it is only necessary for valve 282 to be altered when switching to de-icing mode, and the pressure drop is measured across the ambient air side of the heat exchanger 216 since in this embodiment it will be most susceptible to icing, being open loop.

Figure 31:
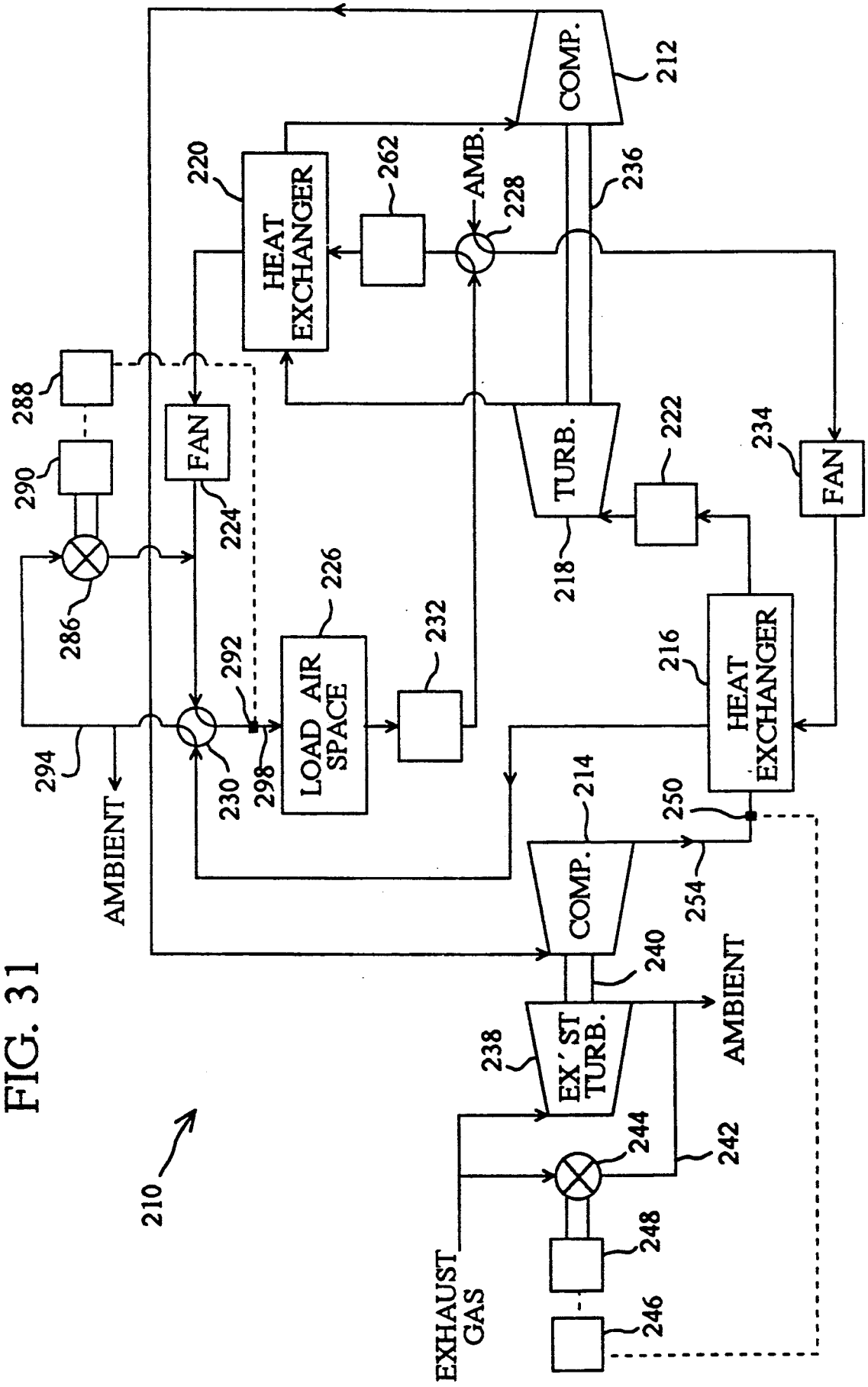
FIG. 31 is a schematic diagram of the air conditioning system of FIG. 23 modified to allow control over the air delivery temperature.

FIG. 31 shows the embodiment of FIG. 23 modified to allow a greater degree of control over the temperature of the conditioned air. The addition of a control valve 286, valve controller 288, valve actuator 290, temperature sensor 292 and extra duct 294 allows a controlled amount of air to be diverted from the hot stream leaving the ambient pressure side of the heat exchanger 216 and mixed, via the duct 294, with the cold air being delivered to the load air space 226. In this way the temperature at which the conditioning air is delivered can be adjusted.

Figure 32:
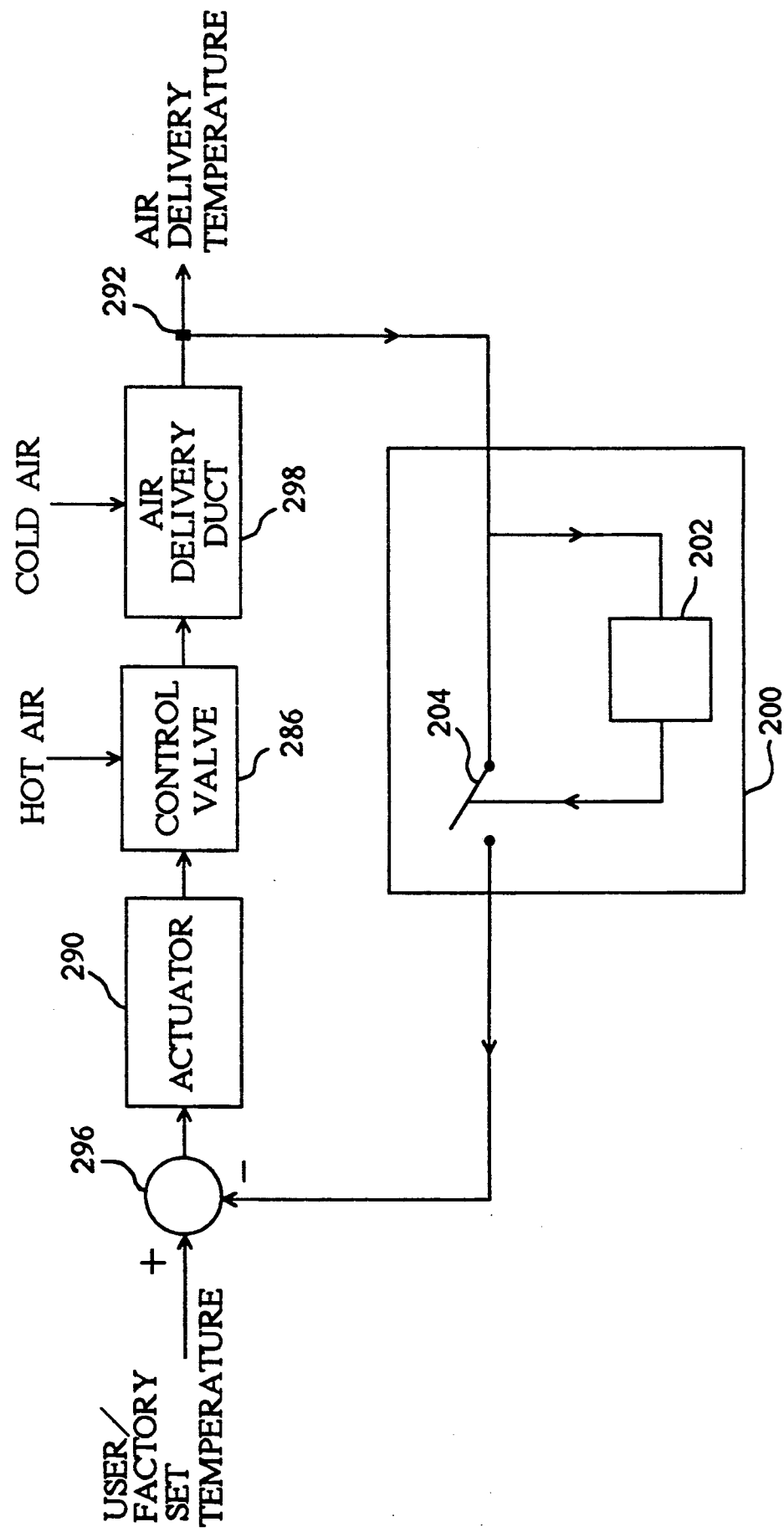
FIG. 32 is a block diagram of the preferred control system necessary to obtain the desired air delivery temperature from the air conditioning system of FIG. 30.

FIG. 32 is a block diagram of the preferred additional control system for implementing the air delivery temperature control described for the embodiment of FIG. 30. The desired air delivery temperature may be input by the user but would normally be factory-set. A negative feedback summer 296 compares the set temperature with that measured by the temperature sensor 292 positioned in the air delivery duct 298, and adjusts the valve 286 by means of the actuator 290 thereby altering the amount of hot air diverted through the duct 294. The air delivery temperature is adjusted in this way until it lies within a temperature band defined in the feedback circuit 2100 by a high/low threshold crossing detector 2102. Once the measured temperature lies within this band a switch 2104 is opened to nullify the feedback and hence maintain the current setting of the control valve 286. If the temperature subsequently moves out of the band, for instance, due to a sufficient change in car engine conditions, then the switch 2104 is again closed and adjustment of the valve 286 resumes.

It will be clear to those skilled in the art that control of the air delivery temperature in this way may be applied to all of the air conditioner embodiments described previously, with slight modifications determined by the appropriate point from which hot or cold air should be diverted.

While the invention has been particularly shown and described with reference to preferred embodiments thereof, it will be understood by those in the art that the foregoing and other changes in form and details may be made therein without departing from the spirit and scope of the invention.

We claim:

1. An air cycle air conditioning system for cooling or heating a load air space comprising:

a compressor for compressing working air;
an expansion turbine for expanding working air;
drive means connected to said compressor and said turbine;
air supply means for moving secondary air;
heat exchanger means having a first flow path connected at opposite ends thereof to said compressor and said turbine, respectively, and a second flow path disposed in heat exchange relationship to said first flow path connected at one end thereof to said air supply means;
thermal store means for storing heat of air from said compressor and for providing the heat to melt ice blocking air flow through said heat exchanger means;
valve means for selectively connecting said compressor and turbine to one of ambient air and a load air space and for selectively connecting said air supply means and an end of said second flow path opposite said one end to ambient air when said compressor and said turbine are connected to said load air space and to said load air space when said compressor and said turbine are connected to ambient air;
control means for a temperature control of the load air space connected to said drive means for controlling said drive means to maintain a nominal desired load temperature and for controlling said valve means; and
circuit means connecting said thermal store means and said heat exchanger means with said circuit means being connected to and operable under control of said control means whereby heat is transferred from said thermal store means to said heat exchanger means through said circuit means when said control means senses a pressure change in air flowing from said expansion turbine through said heat exchanger means;
wherein said turbine and said compressor are connected to said heat exchanger means for delivering air from said turbine through said heat exchanger means to said compressor whereby in a cooling mode air from said compressor is discharged to ambient air through said thermal store means and said secondary air from said heat exchanger means is delivered to said load air space and in a heating mode air from said compressor is delivered to said load air space and said secondary air from said heat exchanger means is discharged to ambient air.

2. An air conditioning system as set forth in claim 1, wherein said valve means are comprised of three two-way valves and a four-way valve.

3. An air conditioning system according to claim 1, wherein said drive means is comprised of a high speed electric motor having an output shaft with said compressor and said turbine connected to said shaft.

4. An air conditioning system as set forth in claim 3, wherein said motor operates at a rated speed of approximately 100,000 rpm and further comprising control means for a temperature control of the load air space connected to said motor for automatically switching the motor on an off to maintain a nominal desired load temperature.

5. An air conditioning system as set forth in claim 4, wherein said control means varies the speed of said motor to maintain a nominal desired load temperature.

6. An air conditioning system according to claim 1, further comprising first moisture control means connected between said heat exchanger means and said load air space for humidity control in the cooling mode and second moisture control means connected between said heat exchanger means and said compressor for humidity control in the heating mode.

7. An air conditioning system as set forth in claim 1, further comprising first moisture control means connected between an ambient air inlet and said turbine for avoidance of icing of said heat exchanger means in the cooling mode and second moisture control means connected between said air supply means and said heat exchanger means for the avoidance of icing of said heat exchanger means in the heating mode.

8. An air cycle air conditioning system for cooling or heating a load air space comprising:
- a compressor for compressing working air;
- an expansion turbine for expanding working air;
- drive means connected to said compressor and said turbine;
- air supply means for moving secondary air;
- heat exchanger means having a first flow path connected at opposite ends thereof to said compressor and said turbine, respectively, and a second flow path disposed in heat exchange relationship to said first flow path connected at one end thereof to said air supply means;
- de-icing means for providing heat of air from said compressor to melt ice blocking air flow through said heat exchanger means;
- valve means for selectively connecting said compressor and turbine to one of ambient air and a load air space and for selectively connecting said air supply means and an end of said second flow path opposite said one end to ambient air when said compressor and said turbine are connected to said load air space and to said load air space when said compressor and said turbine are connected to ambient air; and
- control means for a temperature control of the load air space connected to said drive means for controlling said drive means to maintain a nominal desired load temperature and for controlling said valve and said de-icing means;
- wherein said turbine and said compressor are connected to said heat exchanger means for delivering air from said turbine through said heat exchanger means to said compressor whereby in a cooling mode air from said compressor is discharged to ambient air through said thermal store means and said secondary air from said heat exchanger means is delivered to said load air space and in a heating mode air form said compressor is delivered to said load air space and said secondary air from said heat exchanger means is discharged to ambient air, and
- wherein said de-icing means is controlled so as to provide the heat to said heat exchanger means when said control means senses a pressure change in air flowing from said expansion turbine through said heat exchanger means.

* * * * *